United States Patent
Gurdan et al.

(10) Patent No.: US 8,855,008 B2
(45) Date of Patent: Oct. 7, 2014

(54) DIGITAL MULTIMEDIA NETWORK WITH PARAMETER JOIN MECHANISM

(75) Inventors: Robby Gurdan, Graefenberg (DE); Richard Foss, Grahamstown (ZA)

(73) Assignee: U-Man Universal Media Access Networks GmbH, Grahamstown (ZA)

( * ) Notice: Subject to any disclaimer, the term of this patent is extended or adjusted under 35 U.S.C. 154(b) by 605 days.

(21) Appl. No.: 12/681,287

(22) PCT Filed: Oct. 2, 2008

(86) PCT No.: PCT/EP2008/063195
§ 371 (c)(1),
(2), (4) Date: Sep. 16, 2010

(87) PCT Pub. No.: WO2009/043896
PCT Pub. Date: Apr. 9, 2009

(65) Prior Publication Data
US 2011/0007666 A1   Jan. 13, 2011

(30) Foreign Application Priority Data

Oct. 4, 2007 (EP) .................................. 07117923
Oct. 5, 2007 (EP) .................................. 07117998

(51) Int. Cl.
*H04L 12/28* (2006.01)
*H04L 12/56* (2006.01)
*G06F 15/16* (2006.01)

(52) U.S. Cl.
USPC ............ 370/254; 370/351; 370/390; 709/250

(58) Field of Classification Search
USPC .......... 370/252–255, 338–503; 709/209–214, 709/219–252; 700/94–95; 455/424–518
See application file for complete search history.

(56) References Cited

U.S. PATENT DOCUMENTS

| | | | |
|---|---|---|---|
| 7,075,929 B2 * | 7/2006 | Korus et al. ................... 370/390 |
| 7,376,723 B2 * | 5/2008 | Cho et al. ....................... 709/223 |
| 7,499,983 B2 * | 3/2009 | Acree et al. ................... 709/219 |
| 7,545,771 B2 * | 6/2009 | Wentink et al. .............. 370/329 |
| 7,570,598 B2 * | 8/2009 | Burklin et al. ................ 370/252 |
| 7,814,322 B2 * | 10/2010 | Gurevich et al. ............. 713/171 |
| 7,940,744 B2 * | 5/2011 | Lehotsky et al. ............. 370/351 |
| 8,009,590 B2 * | 8/2011 | Straub et al. ................. 370/255 |
| 8,032,660 B2 * | 10/2011 | Sahita et al. ................. 709/250 |
| 8,098,599 B2 * | 1/2012 | Ho et al. ....................... 370/260 |
| 8,249,071 B2 * | 8/2012 | Kreifeldt et al. ............. 370/392 |
| 8,477,812 B2 * | 7/2013 | Gurdan et al. ............... 370/503 |
| 2003/0172797 A1 | 9/2003 | Juszkiewicz et al. | |

(Continued)

OTHER PUBLICATIONS

"XFN-Cross Fire Network—Wikipedia"—XP-002533830 XFN-Cross Fire Network aus Wikipedia, der freien Enzyklopedie; http://de.wikipedia.org/w/index.php?title=XFN-Cross_Fire_Network&oldid=21303855; one page, dated Jun. 24, 2009.

(Continued)

*Primary Examiner* — M. Phan
(74) *Attorney, Agent, or Firm* — Westman, Champlin & Koehler, P.A.

(57) ABSTRACT

A digital multimedia network with a parameter join mechanism comprising at least one apparatus. A requesting device parameter of a source apparatus updates a local parameter group list by adding an entry for each device parameter of a target apparatus which joins the parameter group.

12 Claims, 21 Drawing Sheets

(56) References Cited

U.S. PATENT DOCUMENTS

| | | | |
|---|---|---|---|
| 2004/0225491 A1* | 11/2004 | Chang | 704/2 |
| 2005/0239396 A1 | 10/2005 | Kreifeldt et al. | |
| 2006/0079181 A1* | 4/2006 | Yun et al. | 455/41.2 |
| 2007/0054687 A1* | 3/2007 | Akita et al. | 455/518 |
| 2007/0243902 A1* | 10/2007 | Puschel et al. | 455/560 |
| 2008/0146217 A1* | 6/2008 | Bonnett | 455/424 |
| 2009/0270038 A1* | 10/2009 | Clausen | 455/63.1 |

OTHER PUBLICATIONS

Office Action Dated Oct. 9, 2009 for Counterpart European Application No. 07 117 923.8, Filed on Oct. 2, 2008.

International Search Report and Written Opinion of the International Searching Authority for PCT/EP2008/063195 filed on Oct. 2, 2008; date of Search Report Jul. 13, 2009.

* cited by examiner

Fig. 7

| Target Device ID | Sender Device ID | Sender Parameter ID | | |
|---|---|---|---|---|
| Sender Parameter ID (continued) | User Level | Secure PIN | | |
| Message Type | Sequence ID | | | |
| Command Executive | Command Qualifier | Section Block 8 bits | Section Type 8 bits | |
| Channel number 24 bits | | | Parameter Block 8 bits | |
| Parameter Block Index 24 bits | | | Parameter Type 16 bits | |
| Parameter Type (continued) | Parameter Index 16 bits | | Value Format 8 bits | |
| Value Field | | | | |

Fig. 8

| Target Device ID | Sender Device ID | Sender Parameter ID | |
|---|---|---|---|
| Sender Parameter ID (continued) | User Level | Secure PIN | |
| Message Type | Sequence ID | | |
| Command Executive | Command Qualifier | SCT_BLK_INPUT ID - 0x01 | SCT_TYPE_AUDIO ID - 0xD1 |
| Channel number ID - 0x100001 | | | PRM_BLK_DIGITAL _AMP ID - 0x11 |
| Numberentry ID - 0x00001 | | | GAIN ID - 0x201 |
| GAIN (continued) | Numberentry ID - 0x0000 | | 8 bit integer ID - 0x00 |

Fig. 11

| Target Device ID | Sender Device ID | Sender Parameter ID ||
|---|---|---|---|
| Sender Parameter ID (continued) | User Level | Secure PIN ||
| Message Type | Sequence ID |||
| Command Executive | Command Qualifier | Destination Parameter ID ||
| Destination Parameter ID (continued) || Value Format | |

Fig. 12

| Target Device ID | Sender Device ID | Sender Parameter ID |
|---|---|---|
| Sender Parameter ID (continued) | User Level | Secure PIN |
| Message Type | Sequence ID ||
| Value Format | ||

Fig. 18
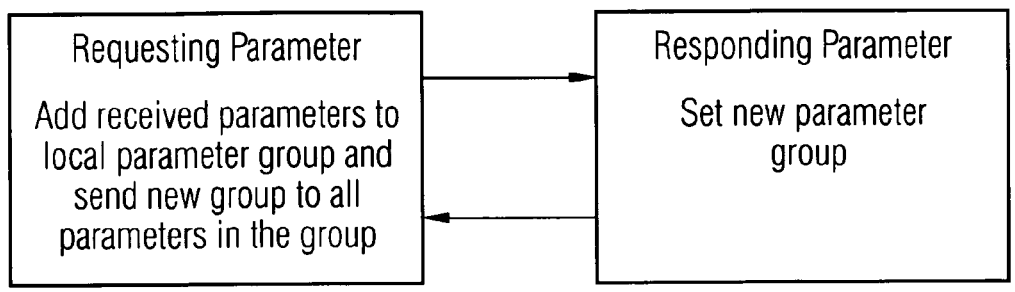
Fig. 19
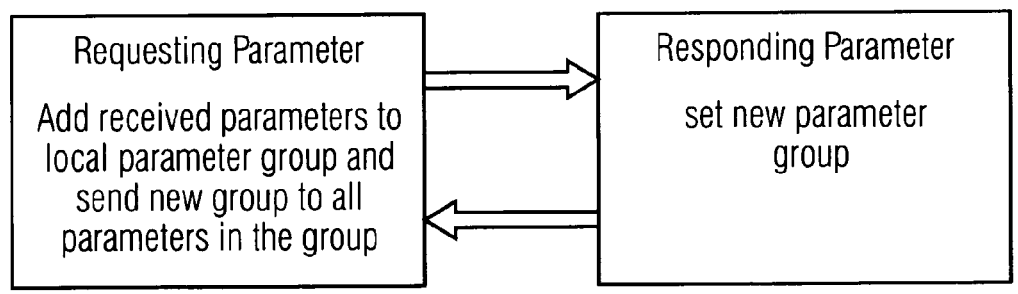
Fig. 20
| Value (Hex) | Group Indicator |
|---|---|
| 0h | Absolute bidirectional |
| 1h | Absolute unidirectional |
| 2h | Relative bidirectional |
| 3h | Relative unidirectional |

Fig. 22
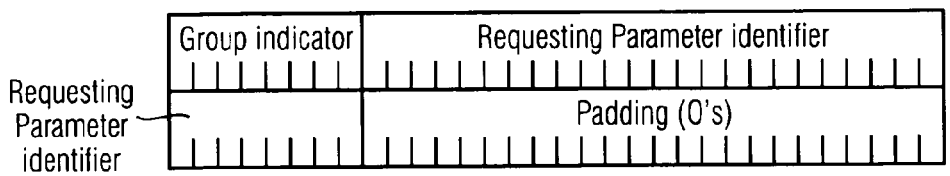
Fig. 23
| Value (Hex) | Field name |
|---|---|
| GET (0h) | Executive command |
| PTPGRP (11h) | Command qualifier |
| XFN_GROUP_DATA (22h) | VALFT |
Fig. 24A
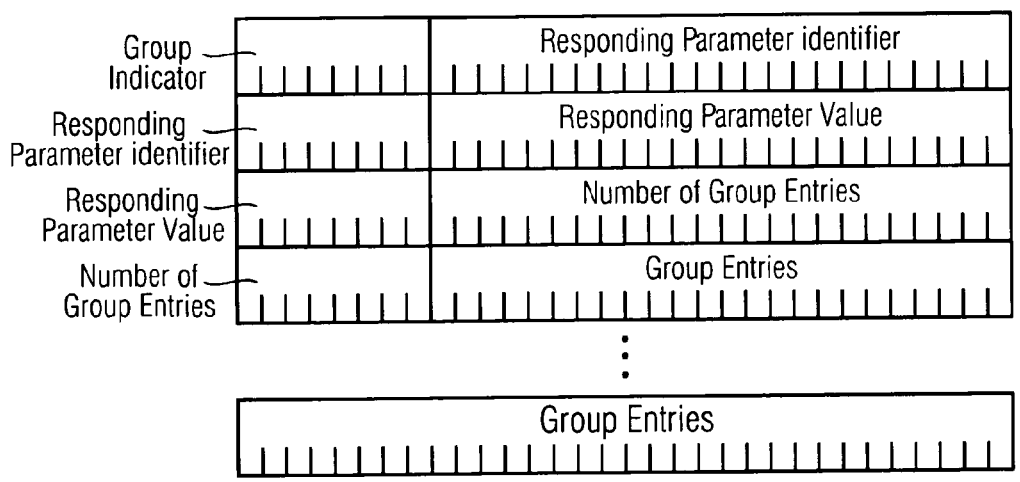

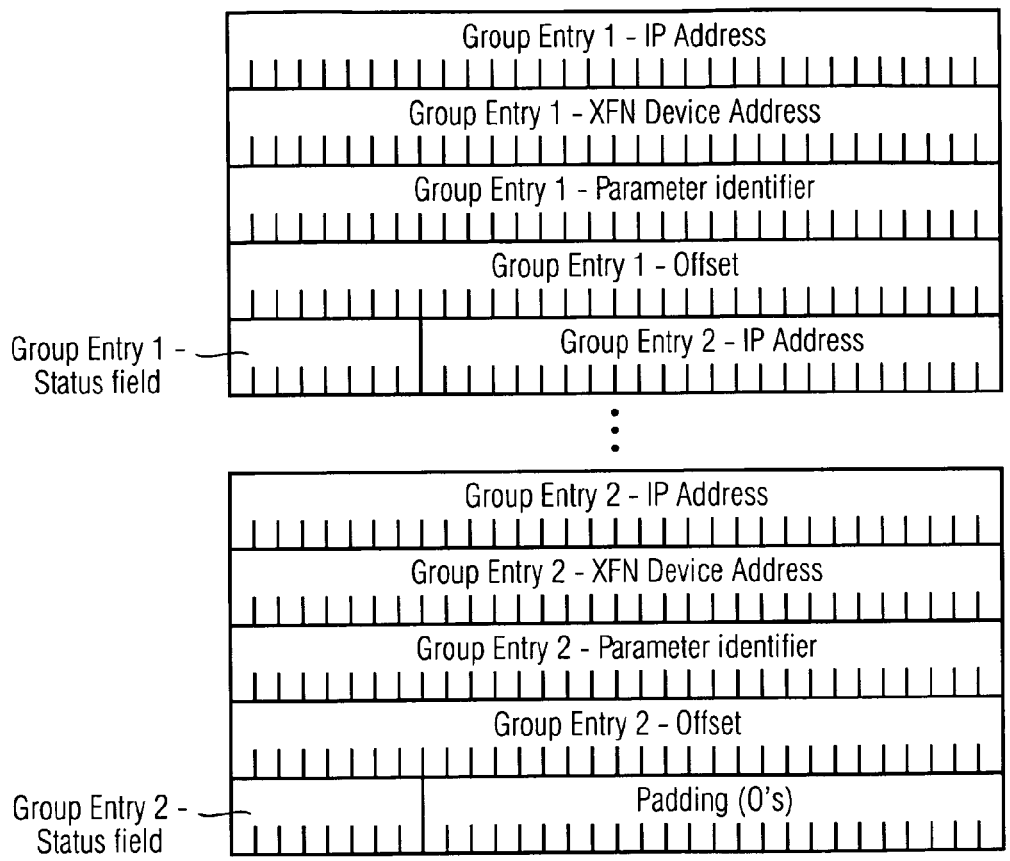

Fig. 29
|  | Executive Command | Command Qualifier |
|---|---|---|
| Conventional parameter update | SET (1h) | VAL (0h) |
| Joined parameter update | SET (1h) | GRP (11h) |
Fig. 30A
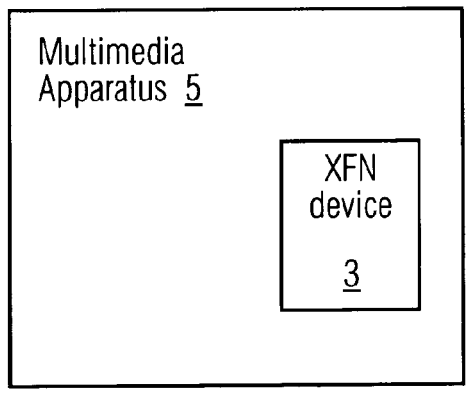
Fig. 30B
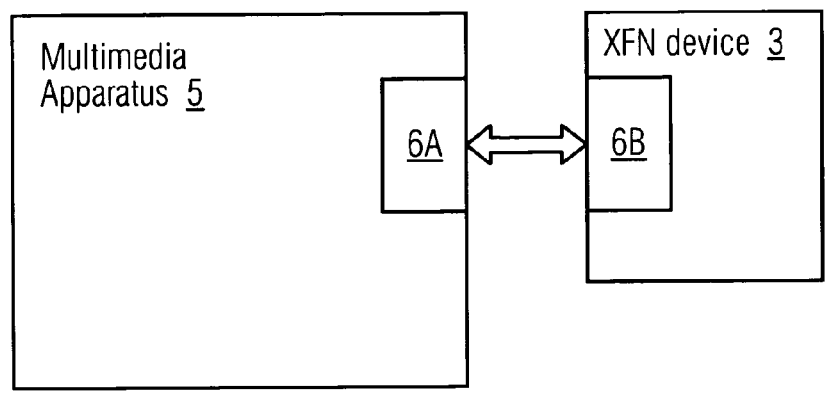

DIGITAL MULTIMEDIA NETWORK WITH PARAMETER JOIN MECHANISM

CROSS-REFERENCE TO RELATED APPLICATION

This Application is a Section 371 National Stage Application of International Application No. PCT/EP2008/063195, filed Oct. 2, 2008 and published as WO 2009/043896 on Apr. 9, 2009, in English, the contents of which are hereby incorporated by reference in their entirety.

TECHNICAL BACKGROUND

The invention is in the domain of digital multimedia networking. In particular, the invention relates to a method and a digital multimedia network which performs a group management of parameters of audio and video devices.

In contrast to most other industries, digital networks have not gained that much footage in the audio/video industry as expected until today. The reason therefore is neither the lack of available technologies, nor the demand for a digital solution. A problem lies more in the basic understanding of how modern technology can achieve substantial benefit for the user migrating to digital, in a non existing common standard, and how a user can understand and cope with a complex system, moreover made by many different manufacturers. To see digital audio/video networks with the eyes of a user it is generally expected that those systems solve tasks set by the user. During the last years, and due to the lack of a common standard, users who were using or even just experimenting with digital solutions had to either specialize their gear to fit it to custom solutions or reduce the expectations to the digital multimedia system so far that the system was rather more than an audio data transport medium.

Conventional multimedia networks have several disadvantages. There is a lack of integration of connection management with control and monitoring. In many cases an established control and monitoring protocol (for example Crown IQ) is carried by a network such as CobraNet that has its own established approach to media routing (for example an SNMP-based approach). Conventional networks require that a controller discovers all the capabilities of target devices on the control network before it is able to communicate. HiQnet requires that there be a URL from which device information can be obtained. A controller for Crown IQ requires the presence of an Object Information file to determine the capabilities of a device. An ACN controller gets a device's capabilities from an XML-based DDL document that it receives from the target device. An AV/C controller extracts device capabilities from an Audio Subunit descriptor that it gets from the target AV/C device. An AES-24/QSC-24 controller learns of a device's capabilities by requesting its handles and corresponding device paths from the registry. An IEC 62379 device controller uses SNMP to discover device capabilities via the MIB's of devices. A disadvantage with this approach are that small controller devices will typically not have the memory and processor capabilities to enumerate the immense amounts of information needed to describe, as an example, a large mixing console. Further, it is not possible to control several parameters of various devices in a large network without first discovering all the capabilities of all these devices.

HiQnet which is compliant with universal plug-and-play (UPnP) provides facilities for an event notification via the GENA-protocol. A control point can subscribe to events that take place in a device, for example state variable changes. In ACN which is an entertainment controlling monitoring protocol, a subscribe message can be sent by a controller to an apparatus to indicate its interest in a particular property. The apparatus then sends event messages to the controller and the property value changes. In AES-24 transient states of an AES-24 object can cause it to emit one or more AES-24 messages. These transient states are called events. The messages that the AES object emits are defined in an event table and are called event messages.

These conventional protocols according to the State of the Art have several disadvantages. In HiQnet and ACN, a control device indicates what parameters it is interested in. When the value of a parameter changes the controller device is notified of the change. This conventional mechanism allows only for setting up master/slave relationships between parameters.

AES comprises the construction of event tables associated with AES-24 objects. When there is a change in the state of an AES-24 object, it emits messages defined in its event table. This conventional mechanism only allows for the construction of a master/slave relationship where a change in a master parameter causes slave parameters to be changed.

Conventional mechanisms according to the State of the Art do not allow for the construction of parameter groups where a change in the value of any parameter within the respective parameter group results in a corresponding change in the value of every other parameter of said parameter group and where feedback loops do not occur.

Accordingly, it is an object of the present invention to provide a digital multimedia network with a parameter joining mechanism where the device parameters can freely enter and leave the parameter group and where feedback loops do not occur.

SUMMARY OF THE INVENTION

The present invention provides a digital multimedia network with a parameter joining mechanism comprising at least one apparatus,
wherein a requesting device parameter of a source apparatus updates a local parameter group list by adding an entry for each device parameter of a target apparatus joining said parameter group.

With the digital multimedia network according to the present invention it is possible that an apparatus with the corresponding group device parameters can leave and return to parameter groups.

Furthermore, the digital multimedia network according to the present invention allows the construction of parameter groups where a change in the value of any device parameter within a parameter group results in a corresponding change in the value of every other device parameter in the parameter group.

In a possible embodiment of the digital multimedia network according to the present invention, the local parameter group list is stored in a memory of the source apparatus.

In a possible embodiment of the digital multimedia network according to the present invention, the parameter group list comprises for each device parameter of the parameter group an IP-address of the target apparatus, a hierarchical parameter address of the device parameter and/or a parameter identifier value PIV of the respective device parameter.

In an embodiment of the digital multimedia network according to the present invention, a requesting device parameter of a source apparatus removes a device parameter of the target apparatus from a parameter group by cancelling the entry of the respective device parameter in the parameter group list of the parameter group.

In an embodiment of the digital multimedia network according to the present invention, the parameter group list comprises for each device parameter at least one status flag indicating the status of said device parameter.

In an embodiment of the digital multimedia network according to the present invention, the status flag indicates whether said device parameter is permanently or temporarily severed from said parameter group.

In an embodiment of the digital multimedia network according to the present invention, a device parameter of the parameter group is controlled by sending a command message to a control device of the target apparatus.

In a possible embodiment of the digital multimedia network according to the present invention, the parameter group is a bidirectional parameter group wherein a change in any device parameter of the parameter group triggers a corresponding change of all other device parameters of the bidirectional parameter group.

In an embodiment of the digital multimedia network according to the present invention, the parameter group is a unidirectional parameter group wherein a change of a master parameter triggers a corresponding change of all other slave parameters of the unidirectional parameter group.

In a possible embodiment of the digital multimedia network according to the present invention, a requesting device parameter of a source apparatus sends, for generating a bidirectional group relationship with other device parameters of the digital multimedia network, a get parameter group list command message to at least one device parameter of a target apparatus to receive a response message containing a parameter group list stored in the target apparatus, which is added to the local parameter group list to form an updated local parameter group list of the source apparatus, which also comprises the requesting device parameter.

In an embodiment of the digital multimedia network according to the present invention, the updated local parameter group list is stored by the source apparatus and sent in a set parameter group list command message to all target apparatuses comprising at least one device parameter of the updated parameter group list.

In an embodiment of the digital multimedia network according to the present invention, the parameter group is an absolute parameter group wherein each device parameter of the absolute parameter group takes on the n absolute parameter value that is sent to it.

In an embodiment of the digital multimedia network according to the present invention, the parameter group is a relative parameter group wherein each device parameter of the relative parameter group is updated when an absolute parameter value is sent to it, in such a way that it maintains a constant relative relationship to the transmitting parameter.

In an embodiment of the digital multimedia network according to the present invention, if a device of a source apparatus detects that another parameter of a target apparatus is severed from the parameter group of said detecting device parameter and that the status flag of the severed device parameter in the parameter group list does not yet indicate that the other device parameter is severed, then the source apparatus sends a set parameter group list command message to all target apparatuses comprising the remaining device parameters within the parameter group to provide an updated parameter group list wherein the status flag of the severed device parameter indicates that the severed device parameter is offline.

In an embodiment of the digital multimedia network according to the present invention, if a device parameter of the source apparatus detects that another device parameter of a target apparatus is no longer severed from the parameter group of the detecting device parameter and that the status flag of the other device parameters still indicates that the other device parameter is offline, then the source apparatus sends a set parameter group list command message to all target apparatuses comprising the remaining device parameters within said parameter group to provide an updated parameter group list and the status flag of said other device parameter is set such that it indicates that the other device parameter is not severed from the other parameter group.

In a possible embodiment of the digital multimedia network according to the present invention, each apparatus of the digital multimedia network comprises a control device having a processor for processing an XFN-stack.

In an embodiment of the digital multimedia network according to the present invention, the hierarchical parameter address of the device parameter consists of parameter grouping identifiers each corresponding to a hierarchy level of a predetermined tree structured parameter hierarchy used for addressing device parameters throughout said digital multimedia network.

The invention further provides a method for joining device parameters of at least one apparatus within a digital multimedia network,
wherein a requesting device parameter of a source apparatus updates a local parameter group list by adding an entry for each device parameter of a target apparatus which joins said parameter group.

In an embodiment of the method according to the present invention, the requesting device parameter of a source apparatus removes a device parameter or a target apparatus from a parameter group by cancelling the entry of the respective device parameter in the parameter group list of the parameter group.

The invention further provides a computer program comprising instructions for performing a method for joining device parameters of at least one apparatus within a digital multimedia network,
wherein a requesting device parameter of a source apparatus updates a local parameter group list by adding an entry for each device parameter of a target apparatus which joins said parameter group.

The invention further provides a data carrier which stores such a computer program.

BRIEF DESCRIPTION OF FIGURES

In the following, preferred embodiments of the digital multimedia network and the method for joining device parameters of a digital multimedia network are described with reference to the enclosed figures.

FIG. 7 shows a further diagram for illustrating the data structure of a command message as employed by the present invention;

FIG. 8 shows a diagram for illustrating a command message as employed by the present invention;

FIG. 11 shows the data format of an index command message as employed by the present invention;

FIG. 12 shows a possible data format of a response message as employed by the present invention;

FIG. 18 shows a diagram for illustrating the synchronization of parameter group lists within a bidirectional parameter group according to the present invention;

FIG. 19 shows a diagram for illustrating adding of received parameters to a local parameter group according to the present invention;

FIG. 20 shows a table for possible defined parameter group indicators as employed by the present invention;

FIG. 22 shows a diagram for illustrating a get group command message data format as employed by the present invention;

FIG. 23 shows a get parameter list with defined XFN-values as employed by the present invention;

FIGS. 24A, 24B show a get group response message format and a group list entry format as employed by the present invention;

FIG. 25 shows a table for a set parameter list with defined XFN-value as employed by the present invention;

FIG. 29 shows a table for executive command targets used for parameter updates according to the present invention;

FIGS. 30A, 30B show different embodiments for the arrangement of an XFN device according to the present invention;

DETAILED DESCRIPTION OF EMBODIMENTS

Figure 1:
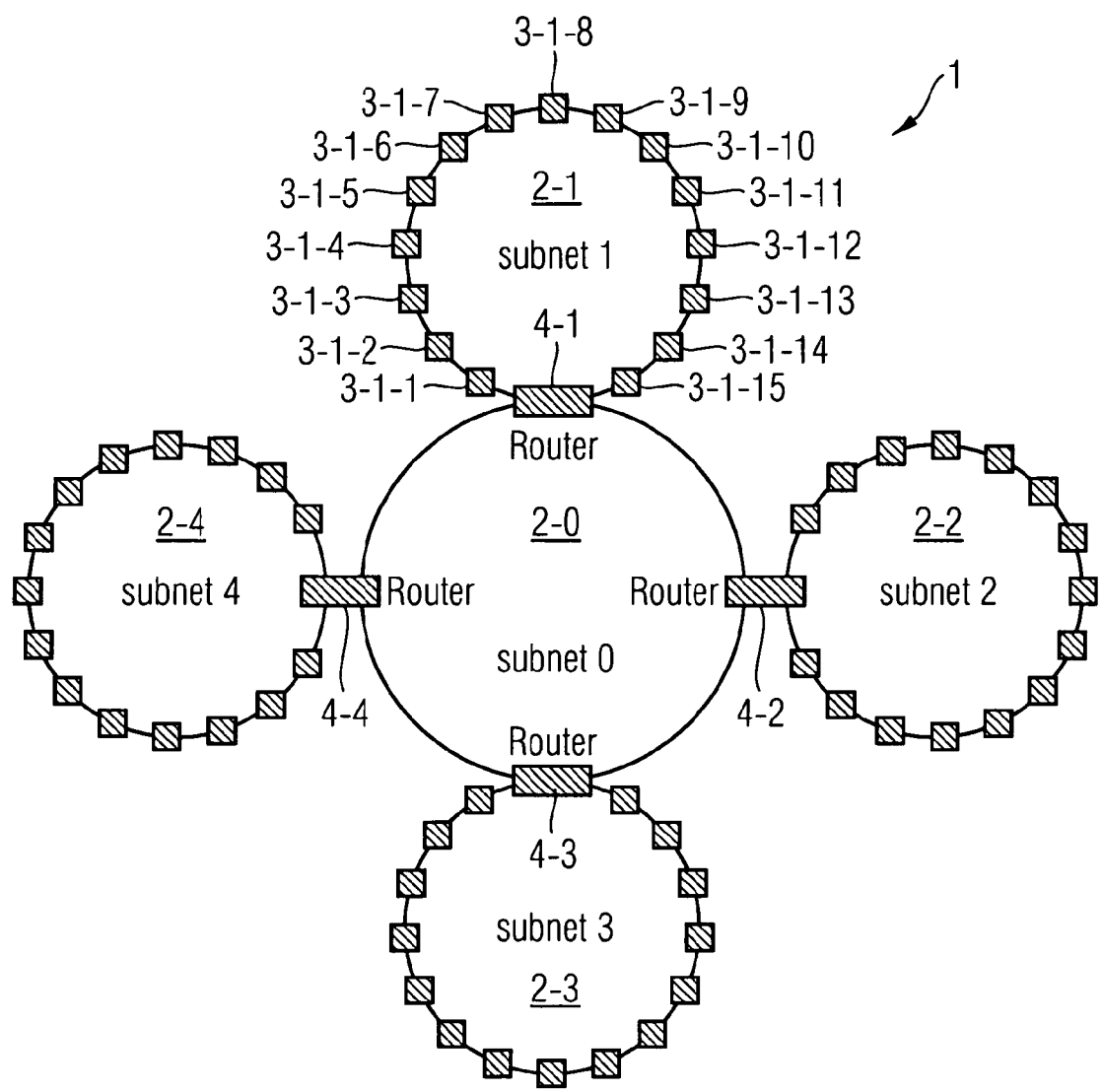
FIG. 1 shows a topology of a possible embodiment of the digital multimedia network 1 according to the present invention.

As shown in FIG. 1 a digital multimedia network 1 can be organized in subnets 2, that form together the actual digital multimedia network 1.

In a possible embodiment a subnet 2-$i$ can either have: CAT 6 cabling with up to 160 audio channels (48 kHz/24 bit) or up to 14 Full HDV video channels plus 80 MBit/s IP data reaching up to 100 m in between units, or an optical connection with up to 320 audio channels (48 kHz/24 bit) or up to 32 full HDV video channels plus 160 MBit/s IP data reaching up to 1000 m in between units.

There is no limitation to the number of subnets 2-$i$ within a digital multimedia network 1 of the present invention. The digital multimedia network 1 supports native bridging of other network standards like Ethersound or Cobranet or multichannel streams like e.g. MADI into native audio streams that can then be used by every device within the network. The digital multimedia network 1 further supports in possible embodiments all kinds of digital audio like AES/EBU, ADAT, Tdif, or SPDIF as well as analog sources up to 24 bit/192 kHz.

The digital multimedia network 1 supports highly precise multiple clocks on each bus, and a fully transparent multiuser connection management. In a possible embodiment, the digital multimedia network 1 of the present invention comprises a ring connection topology which is by default already redundant.

The audio latency within the multimedia network 1 is very low in a subnet 2. In order to keep the latency consistent and low at the same time the digital multimedia network 1 can be organized in a so called multiple ring topology.

Figure 2:
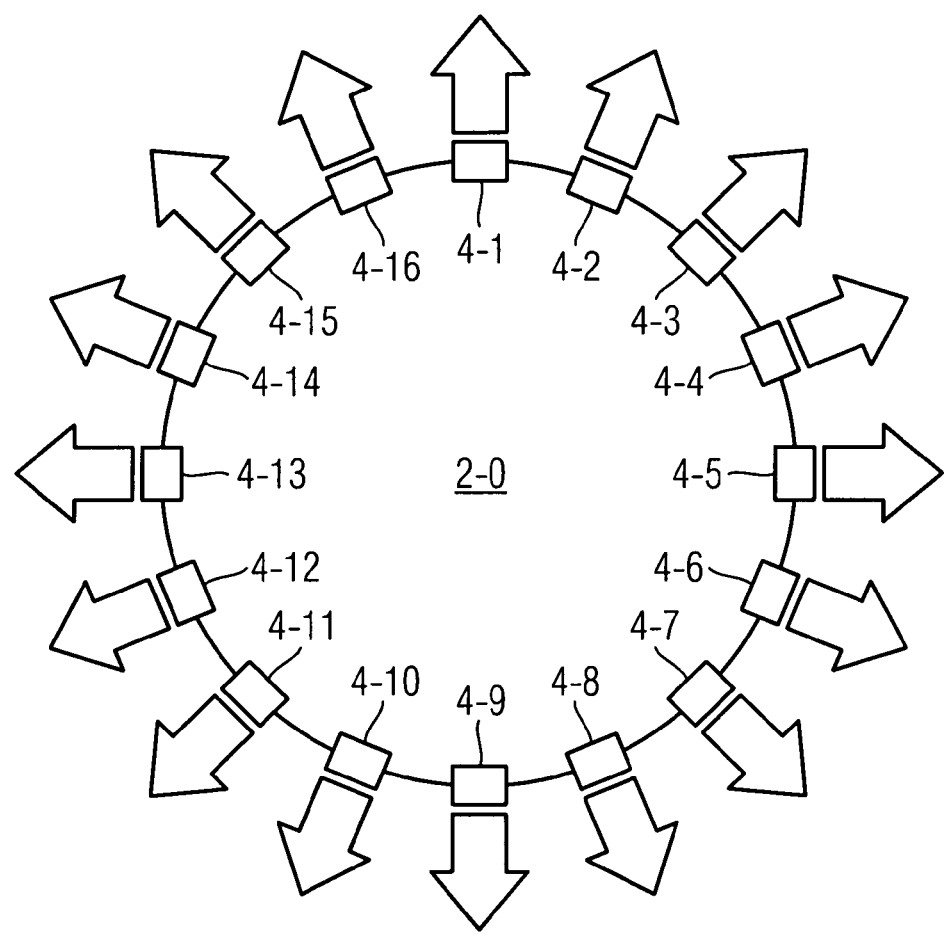
FIG. 2 shows a backbone ring of routers as employed by the digital multimedia network 1 as shown in FIG. 1.

In bigger systems a middle ring of e.g. 16 routers 4 as shown in FIG. 2 the so called backbone 2-0 connects all other subnets 2-$i$ of the network 1 that is basically unlimited. In the example in FIG. 3 the backbone concept allows that many control devices 3 can be used with a global network latency from a device to any other device being less than 1 ms. Each control device 3 can be integrated in a multimedia apparatus 5 such as a mixing console or connected to a multimedia apparatus 5 via an interface.

The backbone, i.e. subnet 2-0 uses a central bus or a cluster of those, that consists entirely of routers e.g. up to 16 routers 4. Every router 4-$i$ can connect to an additional bus with either again a backbone filled with routers or with data streaming devices. By using this concept it is possible to build a vast digital multimedia network 1 with a very low latency.

Figure 3:
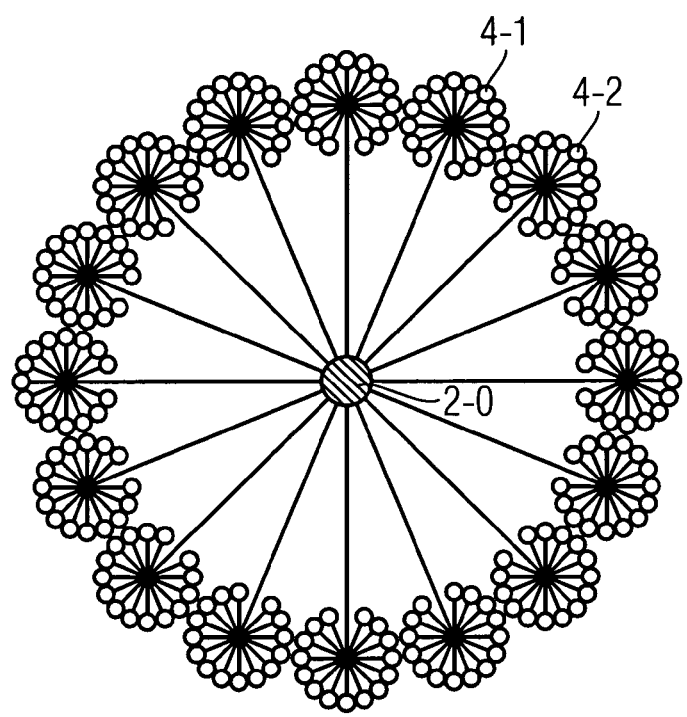
FIG. 3 shows a further example of a topology of a digital multimedia network 1 according to the present invention comprising a cascaded ring structure.

In the embodiment shown in FIG. 3, the digital multimedia network 1 uses cascaded backbones. The center backbone (2-0) in the middle hosts e.g. 16 routers 4, which are individually connected to a corresponding number of satellite backbones. Those satellite routers are each connected with a bus that holds each e.g. 15 control devices 3. This topology will meet the maximum latency of 1 ms (and maximal 4 bus hops). The digital multimedia network 1 consists in this example of 16×15×15=3600 devices and 16×15=240 routers with a total network latency of less than 1 ms.

Figure 4:
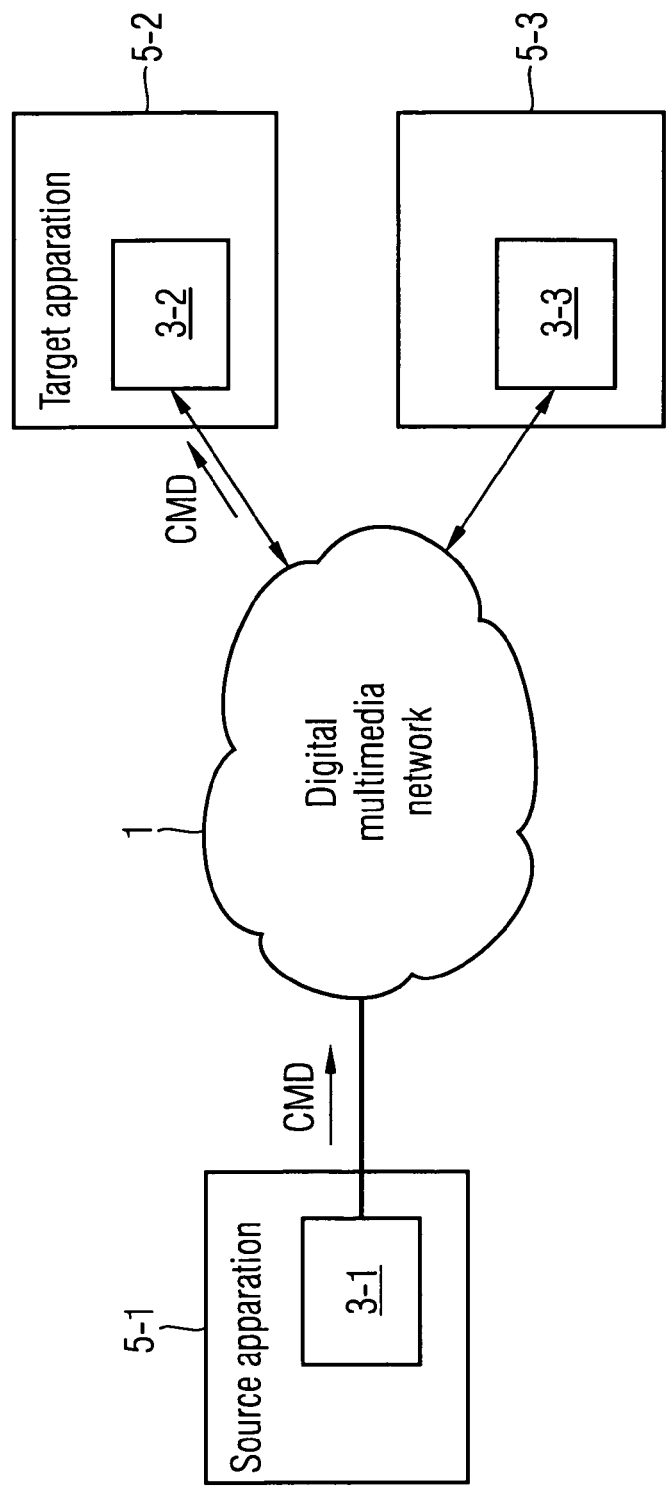
FIG. 4 shows a diagram for illustrating the transmission of a command message from a source apparatus and a target apparatus in the digital multimedia network according to the present invention.

Each control device 3 of the digital multimedia network 1 according to the present invention as shown in FIG. 4 has an IP stack, and is addressable via its IP address. Above the IP stack, each device 3 incorporates a protocol layer that comprises a tree-structured parameter address hierarchy. This parameter address hierarchy reflects the structure of the respective apparatus in which the device 3 is integrated or to which it is connected, whereby nodes at the higher levels of the hierarchy represent groupings of lower level nodes. A sending device 3-1 can send a command message CMD to a receiving device in a target apparatus as shown in FIG. 4.

For example, an XFN device 3 can be integrated in a mixing console 5 which has an input section that comprises a number of channel strips, each with a number of parameter groupings which in turn contain a number of device parameters. Preferably, these parameter groupings are natural to audio engineers and are reflected in the groupings within the device's hierarchy. The lowest level nodes (leaves of the tree) represent actual parameter values and their formats. For any device or apparatus parameter, there is a fixed number of groupings from the parameter level up to the topmost tree grouping level.

Different level descriptions can be used for different industries (e.g. audio, video, avionics, etc.).

The address of a particular parameter of a control device 3 is constituted from a list of several grouping IDs, for example seven parameter grouping IDs or level IDs.

These group objects and their associated IDs can be published. A manufacturer can follow a specification guideline regarding the structuring of parameters in a control device 3 of a multimedia apparatus 5. Thus, a user is able to view an implementation chart for controlling a device 3 and set up a simple controller to control any parameter of the device 3. Furthermore, because of the leveled structure of the messaging, "wildcard" IDs can be used as level IDs, thereby indicating a selection of all nodes at the next level of the tree. This wildcard ID allows for the control of a large number of device parameters with a single command CMD that can be broadcasted to all devices 3 on the digital multimedia network 1. A receiving device 3-2 of a target apparatus is able to receive a range of commands (CMD) for example from a controller or from a sending device 3-1 of a source apparatus. It is possible to trace through the hierarchical tree structure of a device 3 by using "level" commands. These level commands return, for each node of the tree, the subnodes below the node. Through the application of these level commands, a device 3 or an application allows the user to discover device parameters of remote devices and to control them.

A control device 3 can hold an integer parameter identifier value for each device parameter that it contains. On request from a controller which can comprise an XFN device 3, via a "get identifier" command (with an associated structured address), a device 3 of a target apparatus provides this index value to the controller. This allows the controller, in future, to address the parameter with the parameter index value rather than a structured hierarchical address by means of an indexed command message $CMD_{identifier}$. The command messages CMD are transmitted in a possible embodiment wrapped in a IP data packet having at least one command message CMD as payload data.

The digital multimedia network 1 according to the present invention employs a hierarchical control protocol. This hierarchical control protocol has a number of advantages that sets it apart from current control protocols. Every device parameter is described by a hierarchical series of, for example, seven attributes where the higher level attributes indicate high level groupings within a control device 3. This arrangement of attributes means that a single command CMD broadcast across the digital multimedia network 1 has the capability of controlling an enormous number of device parameters. This has important implications with regard to rapid control and minimal bandwidth utilization. A multi level control protocol also allows for unicast control over a particular device parameter. A further consequence of the hierarchical nature of the control protocol is the determination of device parameters on a "need to know" basis. Thus, at any particular level, and hence device grouping, all the subgroups at the next lower level can be easily determined via a single command CMD. This allows an application to provide a user with a simple parameter search capability, which does not require reading the entire parameter set from a control device 3.

The method and network according to the present invention employ a control protocol whose fixed hierarchical message structure models the groupings of device parameters found in professional entertainment devices, thereby allowing for comprehensive control over a network 1 of such control devices 3.

The method and network employing the hierarchical control protocol according to the present invention can be used in a wide range of fields such as live sound, studios, hotels and law courts.

The live sound amplifiers, mixing consoles, signal processing units, breakout boxes, and possibly a workstation, can all reside on the same network, and each containing an IP stack and a protocol stack. Via protocol commands CMD, it is possible to:

modify the control and connection management parameters of a device 3 from the front panel of a device;

enumerate (via level commands) and subsequently modify the control and connection management parameters of any other apparatus 3 on the network 1 from the front panel of a control device or its apparatus;

use a workstation to create a graphic display of control and connection management parameters, and then via the protocol commands enumerate and subsequently modify the control and connection management parameters of any device or apparatus on the digital multimedia network 1;

join parameters into groups by using the front panel of a control device or apparatus or a workstation graphic display;

set up modifiers within control devices 3 by using the front panel or a workstation graphic display;

incorporate a simple controller into the network 1, and by setting up controllers to emit predetermined protocol messages, control one or more device parameters simultaneously (via wildcard level values or joins);

In studios, devices such as synthesizers, breakout boxes, mixing consoles, signal processing units, and workstations, can all reside on the same network, and can each contain an IP stack and a protocol stack. Via protocol commands, it is possible to:

from a workstation, enumerate all control devices 3 on the network 1, and create a patch bay from which control devices 3 can be linked together via multicore cables (isoch streams). Inner cables (sequences) of these multicores can be routed within on-device audio routing matrices;

integrate device parameter control and monitoring into the patch bay, where the same protocol stack is used to handle control, monitoring, and connection management messages.

In hotels or convention centers breakout boxes, mixing consoles, signal processing units, and workstations can all reside on the same network, and can each contain an IP stack and a protocol stack. Via protocol commands it is possible to from any zone in the hotel/convention centre route audio from devices in other zones to devices in this zone. This can be done from the front panel of an apparatus 5 within the zone, such as a breakout box, or from a workstation within the zone.

The XFN (Cross Fire Network) protocol is a hierarchical command and control protocol. XFN is an IP based peer to peer network protocol, in which any apparatus 5 on the network 1 may send or receive connection management, control, and monitoring messages. The size and capability of apparatuses 5 on the network 1 can vary. Some apparatuses 5 are large and incorporate extensive functionality, while other apparatuses 5 are small with limited functionality.

In the hierarchical command and control protocol as employed by the present invention, each device parameter stored in a control device 3 or a corresponding apparatus 5 can be addressed via a hierarchical structure that reflects the natural layout of the apparatus 5 to which the XFN device 3 is connected or in which the XFN device 3 is integrated. For example, there might be an input section on a mixing console apparatus that has a number of channel strips. Each channel strip might have a gain control, a block of equalizers, and a fader control. Each equalizer block will have its own structuring. Each of these groupings is considered to exist at a separate hierarchical level. At the lowest hierarchical level of any device structure are device parameters, i.e. parameters of the corresponding apparatus 5.

A command message (CMD) can access a parameter of a control device 3 by providing a hierarchical parameter address HPA that models the position of the parameter within the apparatus 5, and thereby allows access to it. Each control device 3 can implement an XFN stack that parses such a command message structure, and be able to locate the device parameter.

In a possible embodiment, a "wild card" mechanism allows for control over multiple device parameters. If the address of a command message CMD contains a wild card parameter at any particular hierarchy level, then the addressing applies to all possibilities at that hierarchy level. In this way a single command message (CMD) can affect a large number of device parameters.

Apart from addressing a device parameter via its hierarchical position in the apparatus, it is also possible to address the device parameter via a unique identifier (ID). Each device parameter has a unique ID, and this ID can be obtained by addressing the device parameter and requesting it. Further command messages CMD can replace the hierarchical parameter address HPA, and simply provide the respective ID to access the device parameter, thereby reducing message bandwidth.

The command and control protocol allows device parameters to be joined into parameter groups. Each device parameter can hold a parameter group list PGL of other device parameters on the same or different apparatuses 5, to which it is joined. If the device parameter is modified by a command message CMD, then that same command message CMD is directed at all device parameters within its parameter group list PGL. For example, a fader on a mixing console typically has a device parameter that represents its position. This device parameter might be joined to fader parameters on other mixing consoles, and possibly to gain parameters on breakout boxes. When the single fader is moved, its parameter group list PGL is scanned and command messages CMD are sent to all joined device parameters.

The command and control protocol as employed by the present invention can further incorporate a possible embodiment "Modifiers", whereby any command message CMD can have its hierarchical message structure modified at any one of the levels. A modifier can for example increment a channel number level of all command messages CMD entering a control device 3 of an apparatus 5, and thereby effect immediate control over a second block of channels.

Figure 5:
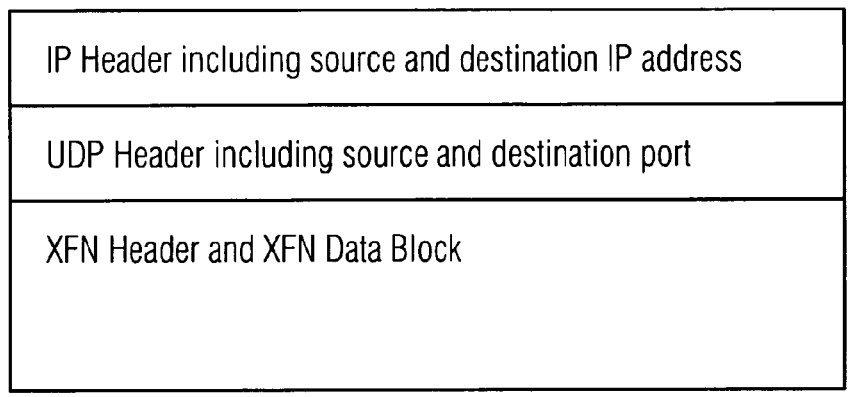
FIG. 5 shows a diagram for illustrating a possible data structure of a command message as employed by the present invention.

A command message CMD can be contained within the data area of a UDP datagram. The UDP header and data area can in turn be contained within the data area if an IP datagram. Every IP datagram has within its header a source and destination IP address. The overall layout of a command message CMD is shown in FIG. 5.

Figure 6:
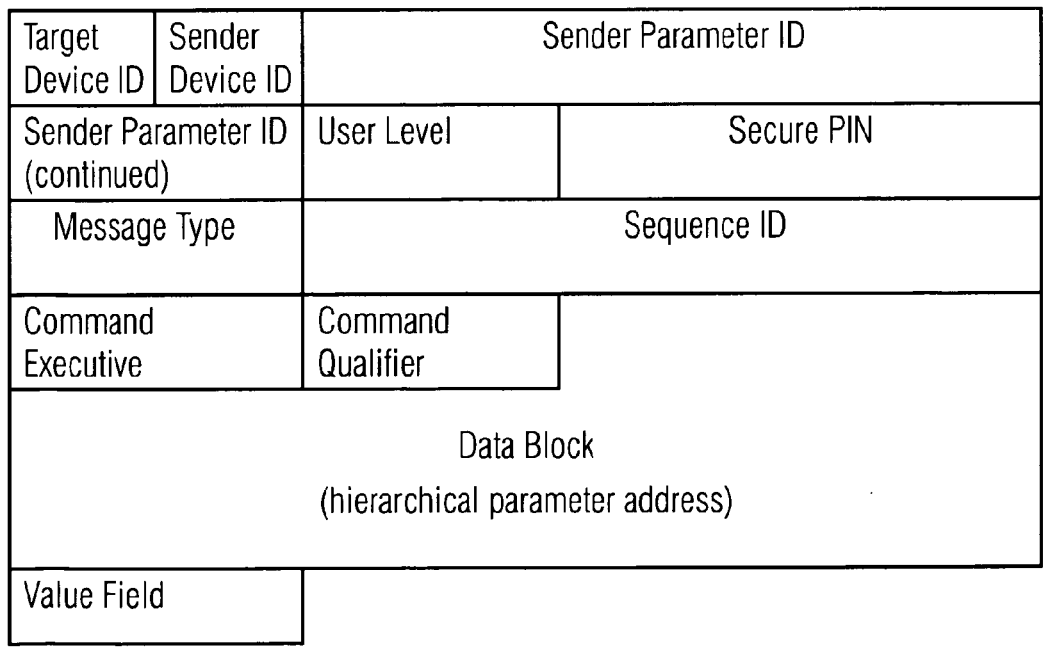
FIG. 6 shows a further diagram for illustrating the data structure of a command message as employed by the present invention.

The primary purpose of command and control messages CMD is to get and set the various parameters of apparatuses 5, and in so doing control the various capabilities of these apparatuses 5. A command message CMD is a data structure with a number of components. The full layout of the command message CMD is given in FIG. 6. When setting the value of a device parameter, a data block, i.e. a hierarchical parameter address is followed by a value field. In a possible embodiment, a header of a command and control message CMD can comprise the data fields as shown in FIG. 6.

Target Device ID and Sender Device ID: Usually, each control device 3 within the digital multimedia network 1 is uniquely addressed via an IP address. However, it may happen that a control device 3 incorporates a number of units that function as complete devices, or that a PC acts as a proxy for a number of non-XFN devices, such as AV/C devices. In such cases, the target and sender device ID's are used to distinguish the individual control devices 3 at the same IP address.

Sender Parameter ID: Every device parameter within a control device 3 has a unique parameter ID. For example, a gain parameter on a mixing console has a unique parameter ID, just as a graphic slider on a workstation control window has a unique parameter ID. A command message CMD is usually generated and transmitted to a destination parameter of a receiving (target) device, due to a change in a source parameter of a sending (source) device. It is often necessary for the destination device parameter of the receiving device 3 within a target apparatus to interact with the source parameter of the sending device 3 within a source apparatus. Hence, a sender parameter ID of a source parameter is provided.

User Level: It is useful to assign user levels to users based on how comprehensively they can access control devices 3 and their associated device parameters. This data field allows device parameters to know the user level of a user who has submitted a command via a command message CMD, and to allow the device parameter to act appropriately depending on this user level.

Secure PIN: The Secure PIN mechanism provides an access control over a device's parameter. This can be useful, for example, when command messages CMD control the routing of audio that contains sensitive information. In this case the PIN that accompanies the command messages CMD are used to determine whether the source of the command message CMD has the appropriate access rights.

Message Type: Certain command messages CMD are requests, and others form responses. Some command messages CMD contain detailed hierarchical information data to describe a device parameter, while others contain parameter ID's. The Message type field indicates the nature of the command message CMD.

Sequence ID: If a command message sending device of a source apparatus transmits a large number of command messages CMD, and does not wait for a response before transmission, then it should be able to identify the responses. The sequence ID enables this identification.

Command Executive and Command Qualifier: Every command message CMD contains a command together with an indication (via the data block) of the device parameter or group of device parameters that the command message CMD relates to. Each device parameter can have a number of attributes such as its value, its state (identified by flags), its name, etc. The command executive component of a command message CMD indicates the fundamental nature of the command (get, set, etc), while the command qualifier allows the command executive to be directed at a particular attribute of a device parameter, or a particular grouping of device parameters (such as a selection group).

Besides the header data, a command and control message (CMD) comprises a data block: The data block provides the address of a target device parameter of a target apparatus in a N-level hierarchical format. This hierarchical structure enables groups of device parameters to be addressed with a single command message CMD. From a manufacturer's point of view, this is the most important component of the command message CMD, and appropriate hierarchical structures can be chosen for each device parameter.

The command message data bock is used to address a target parameter via a N-level hierarchy. The structure of the data block results from the observation that any apparatus 5 can be viewed as a series of functional groupings and that device parameters are positioned at the lowest level of such a series of groupings. For an example, an audio mixing console apparatus 5 comprises such groupings.

For example, an audio mixing console apparatus 5 can have the following top level groupings:
  a digital and analogue input section,
  an input matrix to patch these analogue and digital inputs to channels,
  an input section comprising a number of channels with various signal shaping functions,
  a bus matrix where inputs and outputs are routed to and from buses, respectively,
  an output section comprising a number of channels with various signal shaping functions,
  an output matrix to patch the various output channels to digital and analogue outputs,
  a digital and analogue output section.

The input section has a number of channels, wherein each channel has a block of equalizer and compressor parameters. Each equalizer parameter within the equalizer parameter block can be assigned a particular value.

A similar hierarchy can be constructed for inter-device connection management parameters by viewing their functional groupings. For example most apparatus 5 that utilize digital audio networking can be considered to have input or output sections that transmit clusters of channels, where each of these clusters have parameters such as channel count associated with them.

In a possible embodiment, in particular suited for professional audio-related parameters, a hierarchical multi-level parameter address MPA conforms with the following hierarchical functional groupings:
  section block (level 1),
  section type (level 2),
  channel number (level 3),
  parameter block (level 4),
  parameter block index (level 5),
  parameter type (level 6),
  parameter index (level 7).

In the following, these functional groupings are briefly described:

Section Block (level 1): This is the highest functional group. Any device can be considered to comprise a number of sections. For example, there might be an Input section, Output section, Input Matrix section, Output Matrix section, etc. This top level grouping will identify the high level section block within which the device parameter resides.

Section Type (level 2): This can be viewed as a sub-group within the section block, and is used to differentiate components of the section block. For example, within the Input section block of a mixing console, there can be various types of inputs—mic inputs, line inputs, tape inputs, etc.

Channel Number (level 3): Most audio or video parameters are related to an audio or video channel. These device parameters can be responsible for processing a channel or routing a channel. It is important to be able to trace a channel throughout a multi-device network 1, and by ensuring that each parameter structure includes the channel number at level 3, this capability is facilitated.

Parameter Block (level 4): It often happens that device parameters are clustered into parameter groups, and that these parameters as a group allow for the processing and routing of audio channels. For example, there can be a block of equalizers that allow for wide ranging equalization of an audio channel.

Parameter Block Index (level 5): This grouping allows for differentiation of similar components within a parameter block. For example, there can be equalization sub groupings of device parameters related to Q, Frequency, and Gain.

Parameter Type (level 6): As the grouping name indicates, this level provides the type of the device parameter being accessed, examples being gain, low frequency, threshold, etc.

Parameter index (level 7): This final level provides for accurate addressing if there are, for example, many parameters of the same type that process the audio of a channel. The occurrence of multiple gain parameters within a channel is an example.

FIG. 7 shows the hierarchical parameter address block within a command and control message (CMD) in more detail.

The Value Format field provides an integer that indicates the type and length of the value in the Value field. The Value field does not form part of the hierarchical parameter address, but it follows the parameter address and can be of varying length according to the value in the Value format field of the hierarchical XFN parameter address.

In order to address a target parameter of an apparatus 5, every level within the hierarchical parameter address block is filled in with an identifier that indicates a particular predefined entity appropriate to that hierarchy level. For each parameter in an apparatus 5, a manufacturer can choose such at entity for each level of the hierarchy.

FIG. 8 below shows an example of a command message CMD where the levels of the parameter address data block have been filled in with appropriate identifiers. The device parameter in this case is the gain for a channel on a mixing console.

In this example, the series of values that make up the address of the gain parameter are:
0×01
0×D1
0×100001
0×11
0×00001
0×201
0×0000

Whether the addressed device parameter is retrieved, set to 0×60, or some other action is performed, depends on the nature of the command message CMD as specified in the Command Executive and Command Qualifier fields of the header.

It may seem unnecessarily constraining to require that every device parameter conforms to a fixed N-level hierarchy of N levels, wherein N is e.g. seven. However, there are substantial benefits to knowing that every apparatus or device conforms to such a N-level hierarchy, where the assignment of identifiers at each level are consistent from device to device.

For example, a small controller device within a large network of complex apparatuses 5, such as mixing consoles can easily be used to control a particular parameter of a complex mixing console, for example gain levels on a particular input channel, by dialing in the appropriate N-level address (N=e.g.

7). Command (CMD) messages can then be transmitted to this hierarchical parameter address HPA requesting that the device parameter be modified. If the target device parameter does not exist, the mixing console apparatus 5 does not respond.

Control of device parameters is further enhanced in a possible embodiment by the 'wildcard' mechanism. In place of a device parameter at any level, there can be a wildcard. A wildcard identifier at any level can comprise e.g. a series of 1's. Thus, in the above example, the gains on all channels of a device can be modified by a single command message CMD if the command message CMD contains the following address:
Section Block—0×01
Section Type—0×D1
Channel Number—0×FFFFFF (wildcard)
Parameter Block—0×11
Parameter Block Index—0×00001
Parameter Type—0×201
Parameter Index—0×0000

The wild card indicates that for the given section block and section type, the parameter with the given parameter block/parameter block index/parameter type/parameter index on every channel is to be modified.

It is possible for the wildcard mechanism to be used in conjunction with a broadcast IP address, thereby allowing for control over multiple devices. Thus in the above example, all gains on all channels of all apparatuses 5 in the digital multimedia network 1 can be controlled via a single command CMD message. It is also possible for a wildcard to appear at more than one level within a hierarchical address data block. Thus in the above example, if a wildcard is introduced at the section type level, then access to gain parameters can be widened to include all section types within the Input section block.

The wildcard mechanism can be used to have a wide ranging effect on a large number of device parameters within the digital multimedia network 1. However, it does depend on parameters that conform to a fixed level-based addressing scheme, a consistent grouping at each level, and the use of pre-defined identifiers for the groupings at each level.

Manufacturers can assign addresses to device parameters in a consistent fashion. There can be a substantial number of predetermined identifiers at the various levels. If these predetermined identifiers do not fulfill the addressing requirements of a device parameter, then a manufacturer can request additional identifiers.

It may well happen that a parameter address can be specified without utilizing all N-levels. This will particularly apply to simple devices that don't have complex hierarchical functional groupings. In this case, "dummy" values are placed in the unnecessary levels. For example, if there is only a single parameter of the "gain" type on a particular input channel of a mixing console, then the parameter index field can be filled with the value "1".

A device parameter can be created on a control device 3 and a command message CMD can be sent to a parameter of this control device 3, wherein the command message CMD is parsed and responded to.

Figure 9:
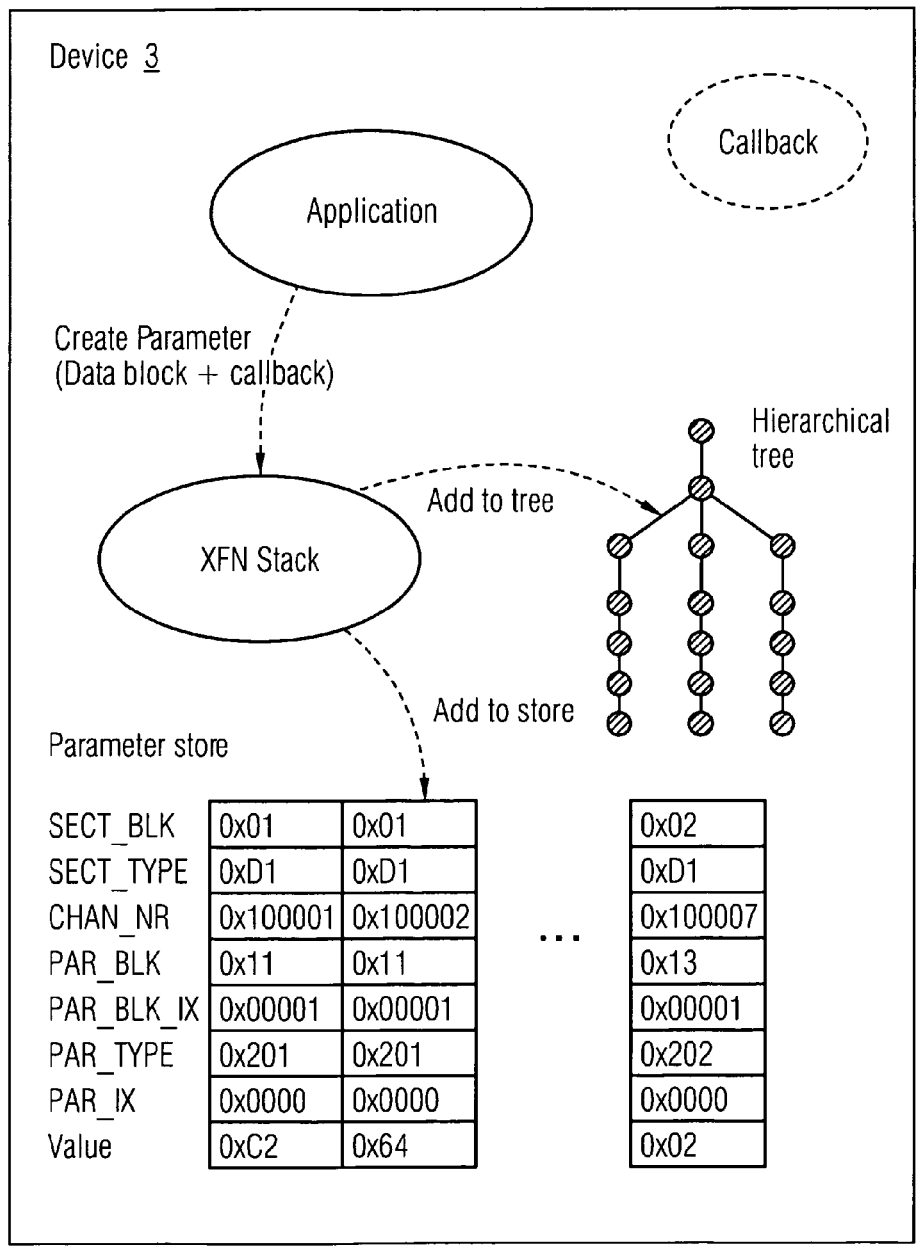
FIG. 9 shows a conceptual model for the creation of a device parameter as performed by the present invention.

FIG. 9 provides a conceptual model for the creation of a device parameter on an XFN device 3 of the digital multimedia network 1 of the present invention. As shown in the figure, each device comprises in a possible embodiment an application, an XFN stack with an associated hierarchical tree structure, and a parameter store containing all device parameters.

When the application starts up, it requests the XFN stack to create parameters by utilizing an XFN stack API. In this request is included the hierarchical address that completely describes the device parameter. There is also a pointer to a callback function that contains code to process the parameter request. The XFN stack incorporates this hierarchical parameter address HPA into the XFN tree by ensuring that there is a node in the tree for each identifier at each level. The XFN stack creates a parameter store entry for each device parameter, and at the bottom level of the tree stores a pointer to this device parameter as well as to the call back function.

Figure 10:
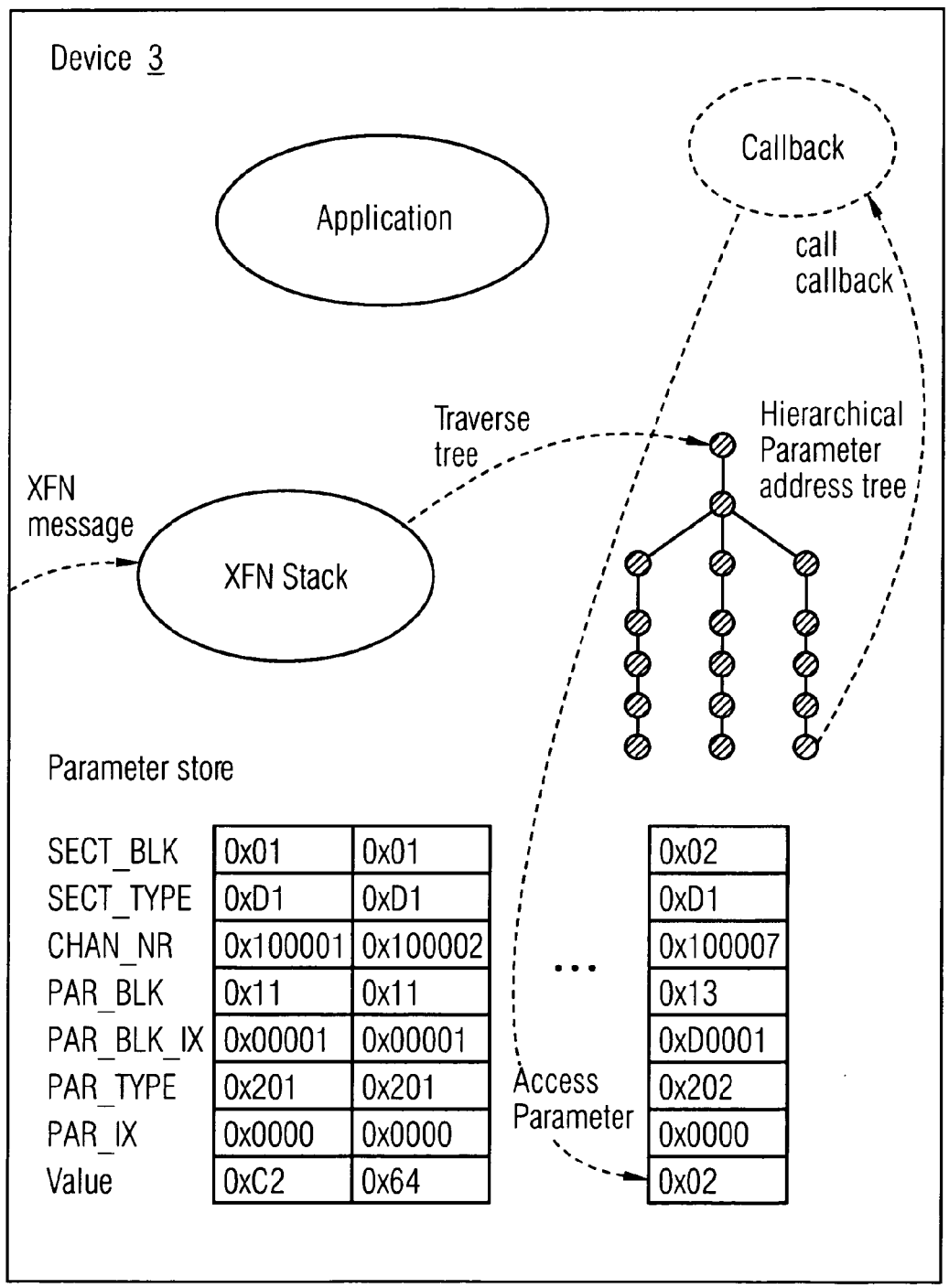
FIG. 10 shows a conceptual model for the processing of a command message as performed by the present invention.

FIG. 10 shows conceptually how a command message (CMD) is processed by an XFN control device 3, and how this results in a parameter access. A command message (CMD) is received by the control device 3, and is passed to the XFN stack for processing. The XFN stack extracts the hierarchical parameter address data block (HPA) from the command message CMD, and uses the successive level identifiers of the data block to traverse the nodes of the hierarchical tree structure. At the appropriate leaf of the tree, the XFN stack finds a pointer to a callback function as well as a pointer to a device parameter. It calls the callback function, providing the parameter pointer. The callback function performs the required function on the device parameter in terms of the underlying host architecture.

In a possible embodiment, there are three fields within a command message CMD that indicate the type of command message CMD that is being transmitted. These are the Message Type, Command Executive, and Command Qualifier data fields. Every command message (CMD) is either a request sent from one control device 3 to another, or is a response from a control device 3 after a request has been made. Some command message requests require a response, while others don't. The request or response nature of the command message CMD is indicated within the Message Type field of the command message CMD. The nature of the request is indicated by the Command Executive and Command Qualifier fields.

Furthermore, the device parameter being addressed in the request can be addressed with a full data block HPA, as shown in FIG. 6, or with a parameter identifier (identifier message). A parameter identifier is an integer value that uniquely identifies a parameter within a device. FIG. 11 shows the format of an identifier command message CMD.

The parameter address data block HPA is replaced in the identifier command message format by a destination parameter ID of e.g. 32 bits. Addressing of the targeted device parameter on a destination device is then performed via a unique parameter ID. All other data fields of the command message CMD are the same.

For every command message request, there is a response from the recipient of the request. The response message is the same, regardless of whether the request comprises a full hierarchical parameter address data block HPA or a parameter ID. A possible format of a response message is shown in FIG. 12. The Sequence ID allows the control device 3 that transmitted the request to determine which request the response belongs to.

As indicated previously, every command message (CMD) contains a command together with an indication (via the data block or a parameter ID) of the device parameter or group of device parameters that the command message CMD relates to. Each device parameter can have a number of attributes such as its value, its state (identified by flags), its name, etc. The command executive component of a command message CMD indicates the fundamental nature of the command (get, set, etc.), while the command qualifier allows the command executive to be directed at a particular attribute of a device parameter, or a particular grouping of parameters (such as a selection group).

Besides others there are some command qualifiers which are employed for the parameter join mechanism of the present invention, i.e. parameter group list (PGL), group value and select.

PARAMETER GROUP LIST: Every device parameter can be grouped into a parameter group list PGL. This command qualifier allows for the retrieval of a parameter group list from a particular parameter, as well as the setting of a group list to a parameter.

GROUP VALUE: This command qualifier enables a parameter of a parameter group list PGL to be modified without influencing other device parameters in the device parameter group.

SELECT: Within a control device 3, it is possible to have a single SEL (selected) group. A flag indicates whether a device parameter is part of the SEL group. This command qualifier can be part of a command message CMD with a GET command executive, and can be directed at a particular device. It causes then the device 3 to return a list of the parameter address data blocks of all device parameters with their SEL flag set.

Each device parameter can have a number of flags associated with it. These flags indicate various states that the device parameter can occupy. A flag can be assigned a single bit within a 32 bit Flags register. This bit can be either 0 or 1, indicating that the flag is either not set or set, respectively. The Flags register can be accessed and modified by using a FLAGS command qualifier.

As certain device parameters within the digital multimedia network 1 according to the present invention are logically related or associated a mechanism is provided to define this relationship. This is achieved by grouping or joining these device parameters into logical clusters, also called join groups or parameter groups.

Three possible types of join groups can be provided:
Master-slave Join Group—in a master-slave join group parameter change notifications are only sent in a single direction which is from a master parameter to all other device parameters that are included as part of this parameter group;
Peer-to-peer Join Group—a peer-to-peer join group allows device parameters within a group to send parameter value change notifications to all other device parameters that are members of the parameter group.
Desk Item Join Group—a desk item join group allows a desk item control parameter to send parameter value change notifications to its associated action parameter, and for the action parameter to send parameter value change notifications to its associated desk item control parameter(s).

Join parameter groups are further defined to be either absolute or relative. An absolute grouping forces all device parameters to take on the same value as the device parameter that is sending out the parameter value change notification. In a peer-to-peer group for example, this ensures that all device parameters within the parameter group are synchronised to the same value. A relative grouping allows device parameters to retain their relative offsets between device parameters based on their offsets when the parameter group is formed.

Every device action parameter of an apparatus 5 can be provided with the capacity to maintain the following join parameter group lists (PGLs):
Master List—a list of all device parameters that act as a master parameter over this device parameter
Slave List—a list of slave parameters that are controlled by this device parameter
Peer-to-peer List—a list of peer-to-peer parameters that require notification about changes to the value of this device parameter and that send notifications to this device parameter should their value change.
Desk Item List—a list of desk item control parameters, held by an action parameter, that require notification about changes to the value of this action parameter.

With each node or apparatus having a control device 3 holding the above four list types it is possible to provide for the cascading of groups where a device parameter can act both as a slave, a master and a peer simultaneously. Cascading of groups is important as it provides for a master-grandmaster relationship.

The establishment of parameter groups PG is performed through the use of a series of Get and Set commands CMD.

A peer-to-peer parameter group between a device parameter A and a device parameter B can, for example, be setup as follows:
a parameter A requests the current peer-to-peer list from device parameter B,
parameter B is currently not joined to any other device parameter therefore the data returned contains only the current value of B and an indication that the only device parameter currently on parameter B's join list is parameter B itself,
parameter A builds an updated peer-to-peer list containing parameter A and parameter B. In building this list Parameter A calculates delta or offset values for each entry contained within the list. These offset values are used to maintain the relative relationship between device parameters in a relative join group. The calculation of this offset value can be performed as follows:
(Current value of parameter sending the join list+offset indicated within the join list)—current value of parameter processing the request;
associated with each parameter group list PGL in the case of a peer to peer group, is a flag indicating if the parameter group is a relative or absolute parameter group. The offset value is only utilised for relative groupings,
parameter A sends a set group list command to parameter B with the actual group list,
parameter B calculates the delta values relative to its current local value and sets up its peer-to-peer group list accordingly.

A master-slave parameter group is formed in a similar manner to the peer-to-peer parameter group, with the exception that a master parameter is required to become a master to all nodes within the peer-to-peer group of its slaves. This is required to ensure that the relationships within the peer-to-peer parameter group remain consistent. Furthermore, each master within a group list held by a slave, has a flag indicating whether the master/slave relationship is absolute or relative.

It is possible that connections between device parameters that are grouped can become broken or temporarily unavailable. A break in a parameter group can be detected through the failure of a device parameter to respond to a set request as a result of a parameter change. If a device parameter is found to be offline it is tagged as such within the parameter group list PGL. While the parameter group PG is broken device parameters are likely to be modified independently of the parameter group and a mechanism is provided that allows the parameter groups to resynchronise when the link is reestablished. If a device parameter that was previously flagged as offline within the parameter group list PGL is now available, a group resynchronization is required. This is done by requesting the parameter group list PGL from the device parameter that was offline and comparing the values within the parameter group list PGL to the values within the local parameter. Any discrepancies between these parameter group lists result in the establishment of another parameter group list PGL that is then set to all nodes within the parameter group list PGL. The value that is applied to the parameter group after the group is resynchronized is the value of the device parameter that was responsible for initiating the resynchronization of the parameter group lists PGL.

A device parameter's value can be changed via a 'SET VALUE' command that is sent to it from a second device parameter in a 'PUSH' state. A parameter's value can also be changed via a 'SET GROUP VALUE' command when it is part of a parameter group, and the value of one of the group members is modified.

There are instances where the values sent from one device parameter to another device parameter need to be modified. For example in the case where two faders need to have an inverse relationship. In this case it is useful to join the two device parameters, but also to modify the values sent between the two device parameters such that the values are inverted.

There are also instances where the hierarchical address data blocks HPA contained within command messages CMD pushed from a device parameter need to be modified. For example in the case where a small controller device with a limited number of faders is required to control the gains on a large multi-channel mixing console. In this case it is useful to be able to quickly modify the channel numbers of the hierarchical address data blocks that are pushed out by the faders. This allows the faders to control gains on any of the channels of the mixing console.

In order to enable these modification capabilities, the hierarchical protocol as employed by the present invention can also incorporate a 'Modifier' mechanism.

Figure 13:
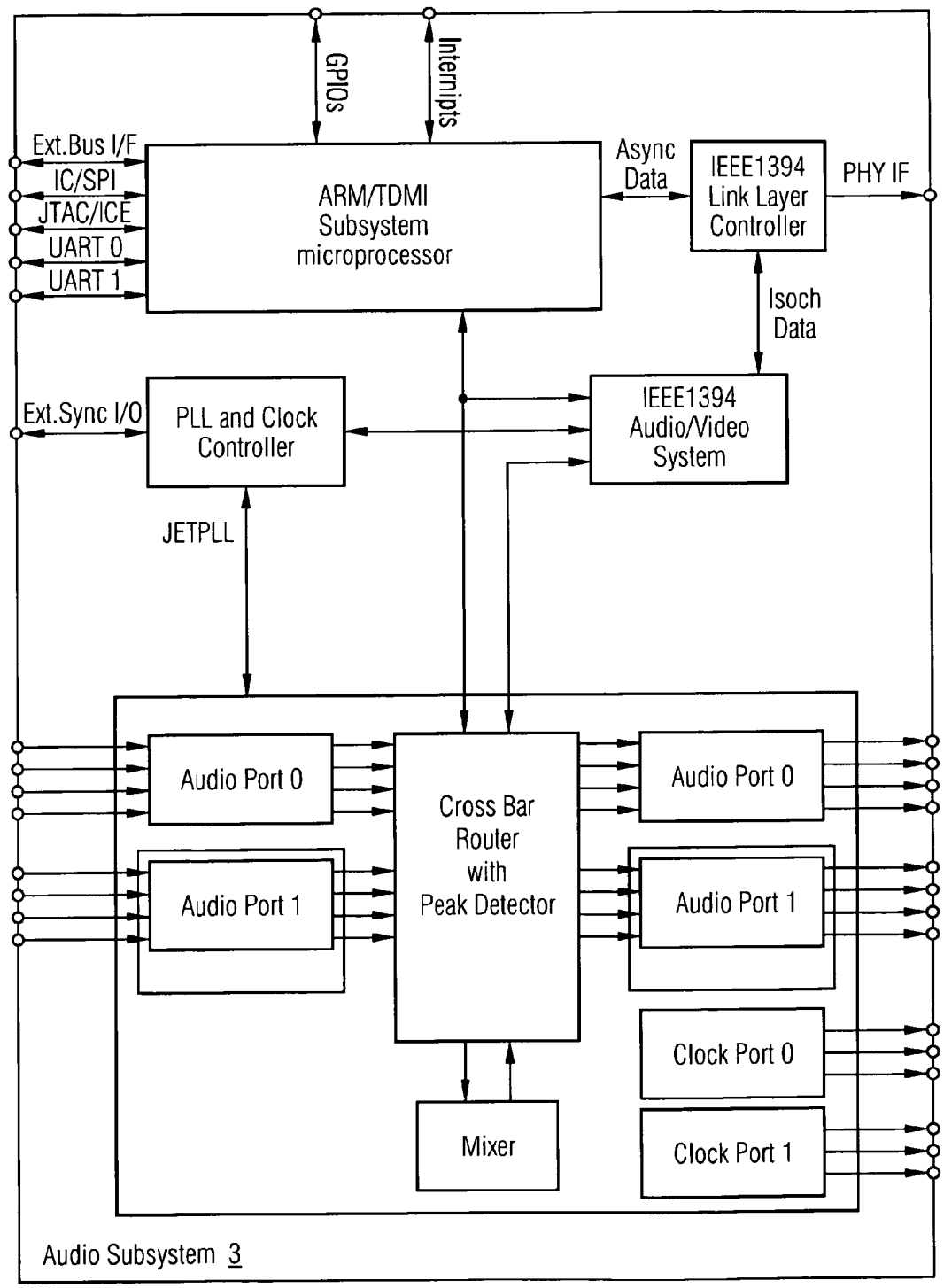
FIG. 13 shows a block diagram of a possible embodiment of a device for processing control command messages as employed by the digital multimedia network according to the present invention.

FIG. 13 shows an example of a control device 3 as employed by the digital multimedia network 1 of the present invention, the so called evaluation box. Device parameters can be assigned to the various capabilities that this device provides. The shown evaluation box 3 incorporates an audio subsystem.

As can be seen from FIG. 13, there is a processor e.g. an ARM processor that can pick up asynchronous packets from a 1394 link layer controller within the audio subsystem. The ARM processor has control over a cross bar router and mixer that lie within the audio sub system. The ARM processor executes in a possible embodiment an XFN stack according to the hierarchical command and address protocol.

The audio subsystem of the control device 3 can receive audio data via two audio ports, and can transmit this audio data to two output ports. The audio input ports and the audio output ports each can have e.g. 4 data lines. The data lines of the audio input ports can be routed, via configuration registers, to AES, ADAT, ARM, AVS (Audio/Video System), or InS source interface blocks. The data lines of the audio output interfaces can be configured to receive from AES, ADAT, AVS, or InS destination interface blocks.

Analogue to digital converters on the boards can be connected to data lines, which are in turn connected to the INS0 and INS1 blocks. The AVS-0 and AVS-1 blocks are the blocks that receive isochronous streams. Thus two isochronous data streams can be received by the audio subsystem shown in FIG. 13. The mixer block refers to 16 output channels of a mixer, which can be routed to destinations.

The outputs from the INS0 and INS1 source blocks can be connected to Audio Output data lines, and these data lines can in turn be connected to digital to analogue converters. The Mixer TX0 and Mixer TX1 source blocks incorporate the input channels of the mixer. Source channels can be connected to these mixer inputs. AVS-0 and AVS-1 refer to the two output isochronous streams. Source channels can be routed to these isochronous stream channels and in this way can be transmitted across the Firewire bus.

The evaluation box device 3 whose audio subsystem is shown in FIG. 13 contains 6 analogue inputs, 8 analogue outputs, an ADAT input and ADAT output, and an AES input and output.

A control device 3 as used in the multimedia network 1 of the present invention is a hardware device that has a particular interface and follows the hierarchical control protocol (XFN) as employed by the present invention.

Control devices 3 of the digital multimedia network 1 can be connected together by daisy chaining them. This is the preferred way of connecting the control devices. If more than two control devices 3 are connected via daisy chain to a ring, the network 1 provides already a first level of redundancy for all devices. Alternatively, the control devices 3 are connected in a star topology.

One of the centrepieces for the usability of the digital multimedia network 1 is the way how audio and video is connected throughout the system. The digital multimedia network 1 stays as close as possible to the analog model. This allows a user to perform his or her connections between control devices 3 as they were used to before.

The digital multimedia network 1 according to the present invention offers the possibility to use a single controller for every device parameter and every necessary logical operation throughout the network. This task is not provided by the controller alone, but certain logical operations are implemented within the control protocol itself and handled by its control devices 3 in order to be able to cope with a variety of possible setups and mix of different apparatuses 5 and ten- or hundreds of thousands of device parameters.

Figure 14:
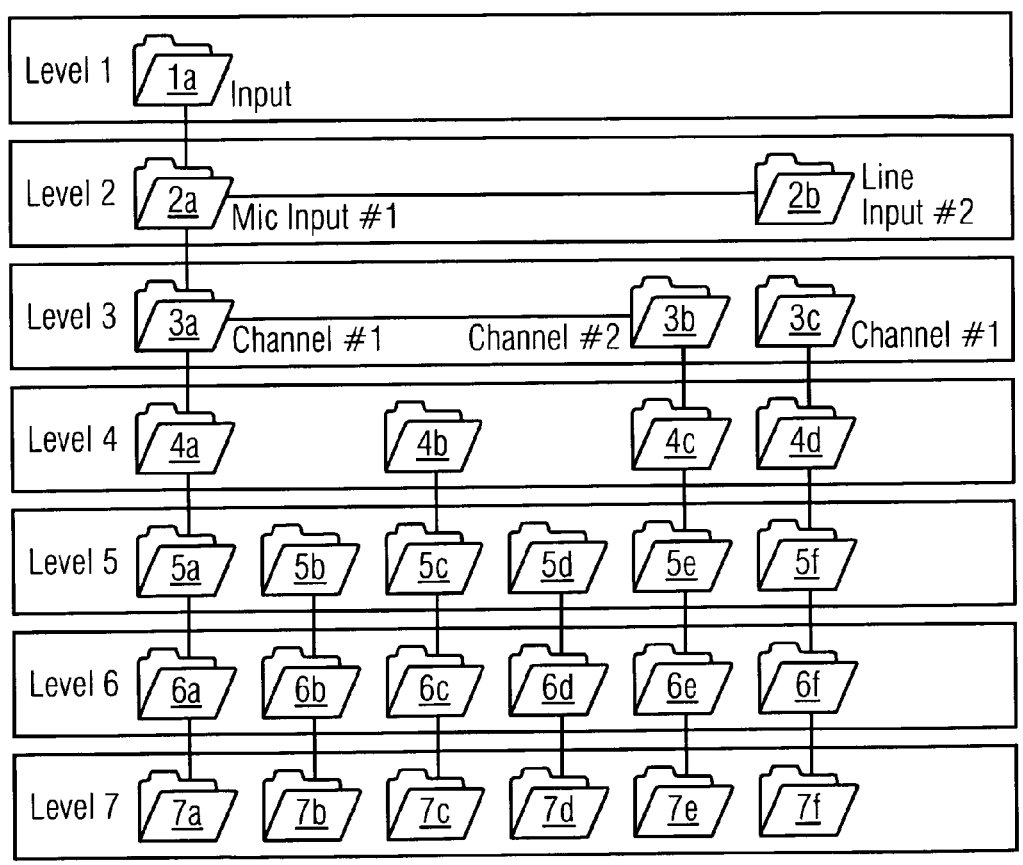
FIG. 14 shows an example of a tree structured parameter hierarchy used for addressing device parameters according to the present invention.

Any control device 3 used in the digital multimedia network 1 of the present invention can control many different device parameters of different apparatuses 5. The device parameters describe all functions of the corresponding apparatus and its interfaces. FIG. 14 shows a typical tree structure.

In order to describe device parameters properly the UMAN (XFN) control protocol uses a fixed level structure. This structure is entirely predefined and function specific, so a certain function of a control device 3 gets a certain address. Another control device 3 of the multimedia network 1 can now, even if it does not know the target device 3, ask for a specific function (e.g. a gain, an equalizer) and if the target device 3 has this function it will respond. Moreover, any control device 3 can use so called wildcards. These wildcards let a device discover any/some/all parameters of another device 3 within other apparatuses. In a remote control, all mechanical controllers like faders, pots, button displays meters etc. are parameters as well as those in e.g. a mixing console, an fx unit or a power amplifier. For example, a fader of a remote control can control the volume of a power amplifier. To do this, the user simply has to select both parameters and then join them.

In any command and control environment, when a device parameter of an apparatus 5 should be controlled, a relationship has to be established between a controlling device (such as a software editor, a hardware controller or any other means of control) and the controlled device parameter. The most common way in the (XFN) control protocol as employed by the digital multimedia network 1 of the present invention is to perform a so called "join" of those device parameters. A join connects device parameters together and makes them exchange data. A join operation always updates every joined parameter. A join can be absolute or relative as well as uni- or bidirectional. A join can hold an unlimited number of parameter group members each individually (absolute or relatively) joined. A join is remembered by every member, i.e. each device parameter of the parameter group PG, even when the connection is lost or a control device of an apparatus is switched off. If one or more members, i.e. parameters, of a joined parameter group PG are switched off or their devices lose connection the remaining parameter group stays together and functional. A joined parameter updates itself after a connection loss to the proper value. Any device parameter can be joined to any and as many as desired other parameters. The digital multimedia network 1 can hold an unlimited number of joined parameter groups PG.

Figure 15:
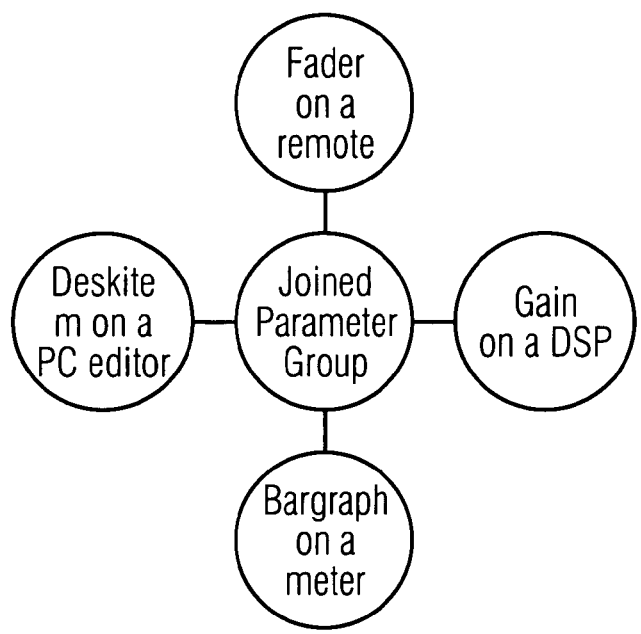
FIG. 15 shows an example of a joined parameter group as employed by the present invention.

A typical example of a joined group of parameters is shown in FIG. 15.

Figure 16:
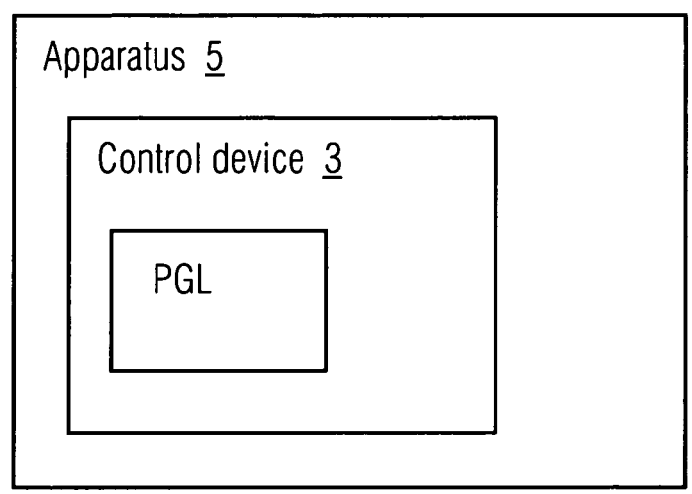
FIG. 16 shows a block diagram of an apparatus within the digital multimedia network according to the present invention having a memory for storing a parameter group list.

FIG. 16 shows a simple block diagram of an apparatus 5 within a digital multimedia network 1 comprising the parameter joining mechanism according to the present invention. The multimedia apparatus 5 is an audio or video apparatus. The apparatus 5 comprises a control device, such as the control device 3 shown in FIG. 13. In the apparatus 5 according to the present invention as shown in FIG. 16, a memory provided for storing at least one parameter group list PGL. In a possible embodiment, a microprocessor of the control device 3 as shown in FIG. 13 has access to such a parameter group list PGL. In the digital multimedia network 1 according to the present invention comprising a parameter join mechanism, a requesting device parameter of a source apparatus 5-1 as shown in FIG. 4 updates its local parameter group list PGL stored in the memory of said source apparatus 5-1 by adding an entry for each device parameter of a target device 5-2 which joins the respective parameter group. The stored parameter group list PGL comprises in a possible embodiment for each device parameter of the parameter group an IP-address of the target apparatus 5-2 and parameter identifier value PIV of the respective device parameter.

The present invention provides a mechanism for grouping device parameters where a group has a list of all device parameters that care to be notified about a parameter change. With the joining mechanism as employed by the present invention device, parameters can be added or removed from these parameter groups. There are two parameter group types employed by the present invention. The first group type is an absolute group type and the second group type is a relative parameter group. These group types define how device parameters that are part of the parameter group respond to changes in the values of peer-device parameters within said parameter group. All device parameters which are members of a parameter group are notified of a parameter change with an absolute value. Parameters that are part of an absolute group will use this absolute value to update their own value. Parameters that are part of a relative group will use this absolute value, together with the stored offset of the transmitting parameter, to update their own value, thereby retaining their relative relationship to the transmitting parameter.

The absolute and relative parameter groups are both further subdivided into unidirectional and bidirectional parameter groups. This results in the following types of parameter groups:
Type 1: absolute unidirectional parameter group;
Type 2: absolute bidirectional parameter group;
Type 3: relative unidirectional parameter group;
Type 4: relative bidirectional parameter group.

Within a bidirectional parameter group a change in any device parameter on any apparatus or device results in a corresponding change of all device parameters within this bidirectional parameter group.

Within an unidirectional parameter group the parameter change notification does only occur in a single direction. An unidirectional parameter group models a master/slave relationship where one device parameter is controlling other device parameters. Any modifications of the master device parameters affect the slave parameters. In contrast, the modification of a slave parameter value does not affect the master value.

In a bidirectional parameter group all device parameters are equal, since all device parameters which are part of the parameter group are notified about a parameter value change.

Figure 17A:
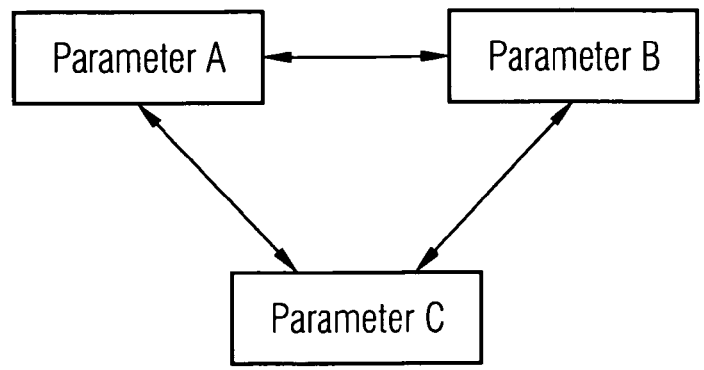
FIGS. 17A, 17B show diagrams for illustrating a bidirectional and unidirectional parameter group as provided by the present invention.
Figure 17B:
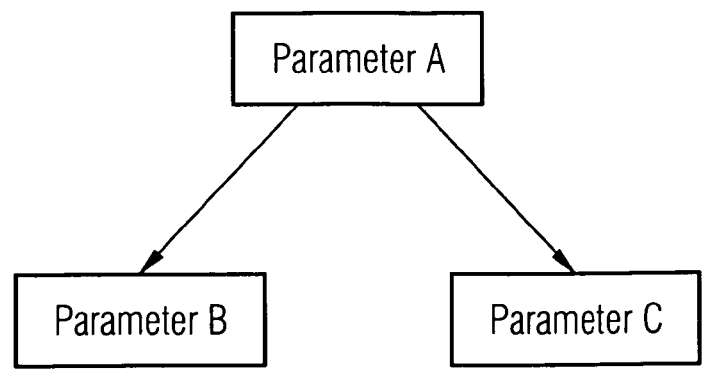

FIGS. 17A, 17B illustrate the difference between a bidirectional parameter group and a unidirectional parameter group. As can be seen in FIG. 17A, in a bidirectional parameter group parameter changes are sent between all joined device parameters of said bidirectional parameter group.

In contrast, in a unidirectional parameter group as shown in FIG. 17B, the parameter changes are sent only in a single direction, from a master parameter to a slave parameter.

The parameter groups as shown in FIGS. 17A, 17B are established through the use of a join mechanism and allows device parameters to freely join and leave parameter groups if required.

FIG. 18 illustrates a join mechanism of a bidirectional parameter group. In order for a device parameter to create a bidirectional parameter group relationship with other device parameters of the digital multimedia network 1 it performs the following steps.

The requesting device parameter as shown in FIG. 18 sends a get parameter list command message to any of the device parameters that are currently part of the parameter group. As the parameter group lists PGL are all synchronized within a bidirectional parameter group, this information can be obtained from any device parameter that is a member of this parameter group. Within the response, i.e. within this parameter list command response, is a group indicator which indicates whether the list is absolute or relative. The control device in the target apparatus responds by sending the current parameter group list PGL of the group type specified in the request message. The requesting device parameter's list must be absolute if the responding device's list is absolute.

Following the request for the parameter group list of the parameter group the requesting device parameter adds these entries into its local parameter group list. This becomes the updated parameter group list that is then sent to all device parameters that form part of this parameter group. Accordingly, for every device parameter entry within the updated parameter group list with the exception of the local requesting device parameter, a set group list command message is then sent specifying all the parameter entries in the respective parameter group. FIG. 19 illustrates the adding of received device parameters to a local parameter group.

In contrast to a bidirectional join mechanism as explained with reference to FIGS. 18, 19 in an unidirectional join, notifications are only sent in a single direction, for example from a master parameter to a slave parameter in a master slave relationship. The unidirectional relationship is only initiated from the device parameter which wishes to exert control over other device parameters in case that a value of the master parameter changes. The master device parameter adds the device parameter that it wishes to exert control over to its local unidirectional parameter group list. This local unidirectional parameter group list is either an absolute or a relative unidirectional parameter group list. Unlike the bidirectional group, the requesting device parameter does not add itself to the parameter group list and does not update the parameter group lists PGL of other device parameters.

Different mechanisms are used to create peer to peer (bidirectional) and master/slave (unidirectional) groups. In contrast to the peer to peer mechanism described in FIGS. 18 and 19, a master/slave join is created when a master sends a 'SET MASTER' command to a slave parameter. If the slave is already part of a peer to peer group, then a master/slave relationship will have to be established with all the parameters that are peers to this original slave parameter.

FIG. 20 shows a table which provides possible parameter group indicators and the associated values.

Figure 21A:
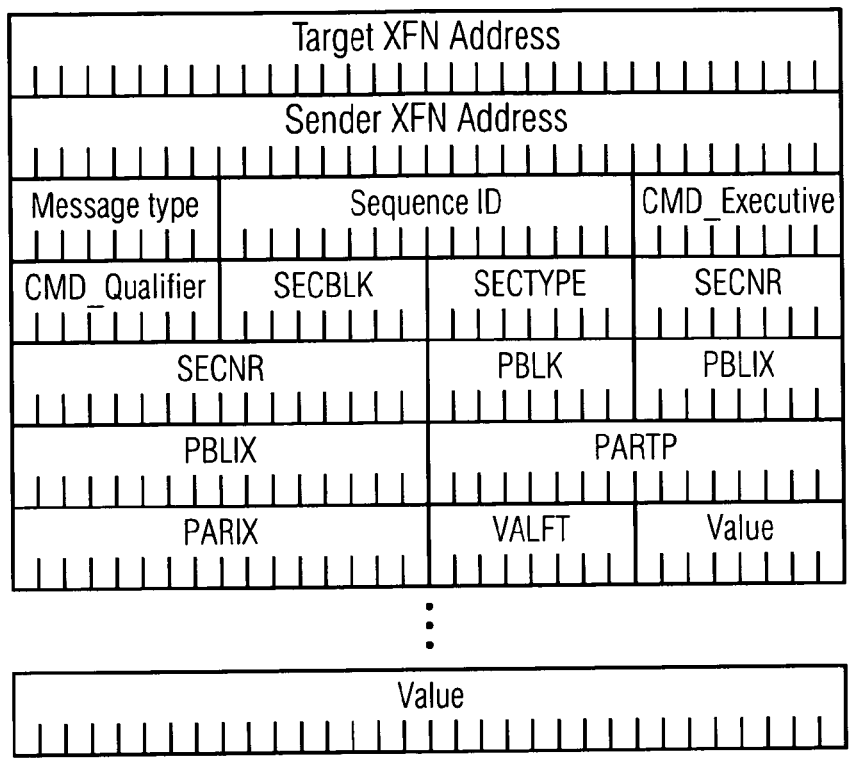
FIGS. 21A, 21B show types for join messages as employed by the present invention.
Figure 21B:
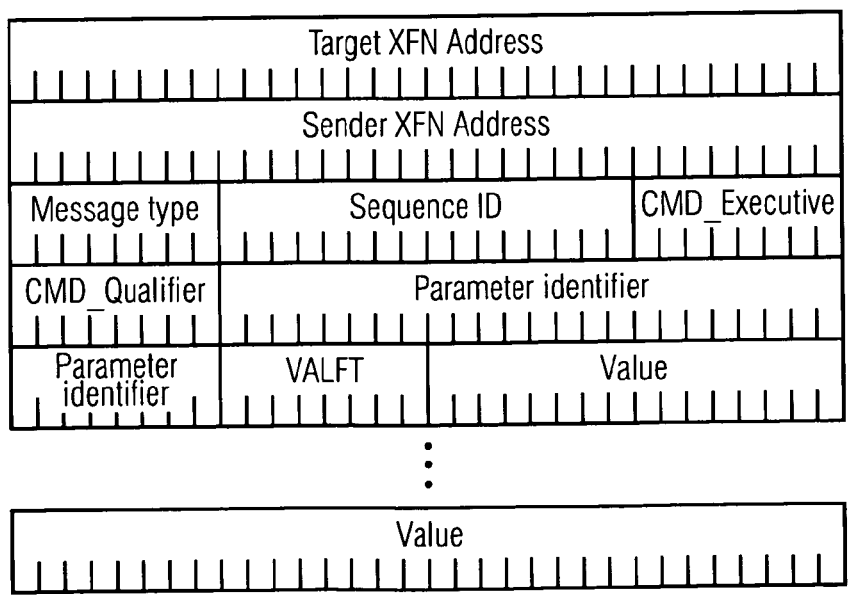

Parameter group join messages can be transmitted with the parameter group setup using data block messages or identifier messages. FIG. 21A shows a full data block message wherein an hierarchical parameter address is provided. FIG. 21B shows an indexed parameter join message comprising a parameter index value PIV.

The first step for adding the device parameter to a parameter group by join messaging is for the requesting device parameter to send a get group list parameter command message to a responding or target parameter of a target apparatus. The data format of the value portion of this command message is shown in FIG. 22. The command message can be sent using either a full index data block, i.e. the hierarchical parameter address, or an indexed message. FIG. 23 shows a table of values assigned to the defined data fields within an XFN-transport message.

The response to the get parameter list command message can contain all entries that are currently part of the parameter group. The response can be transmitted using an indexed parameter message targeted at the device parameter identified within the value portion of the get parameter list request. FIG. 24A shows the data format for a response and FIG. 24B shows the data format of the group entry data for entries 1 to N.

The requesting device parameter extracts the received group entries and formulates an updated parameter group list which is sent to all parameter group entries that are part of the updated list for bidirectional joints. In case of unidirectional joins the updated local parameter group list entries are not sent to the grouped device parameters as the master parameter does not receive parameter change notifications from the respective parameter group. The parameter group lists PGL are updated through the use of a set group list command message. The message format for the set group list command message is identical to the get group list command message which makes use of the defined field values reflected in the table shown in FIG. 25.

The method according to the present invention allows for the inclusion of device parameters in a parameter group and also for the removal of device parameters from such a parameter group. A requesting device of a source apparatus can remove a device parameter of a target apparatus from a parameter group by cancelling the entry of the respective device parameter in its parameter group list.

The method according to the present invention does not only allow for the addition and removal of device parameters from a parameter group but also handles a temporary separation of one or several device parameters from the respective parameter group. In a possible scenario it can happen that an apparatus 5 comprising a device parameter of a parameter group is moved outside the transmission range of other apparatuses comprising device parameters of the same parameter group. Further, it might happen that an obstacle is placed between an apparatus comprising a device parameter of a parameter group and the other apparatuses having device parameters of the same parameter group. Accordingly, it is possible that one or more device parameters are severed either permanently or temporarily from the rest of the parameter group. In a bidirectional parameter group the devices can operate on a peer-to-peer basis so that the device parameters are able to continue operating as if all device parameters are still in place. Only the set of device parameters that have been severed from the parameter group are indicated as being offline. Entries of the severed or separated device parameters are not automatically removed from the parameter group so that if these separated device parameter come back online, the parameter group can be re-established.

Figure 26A:
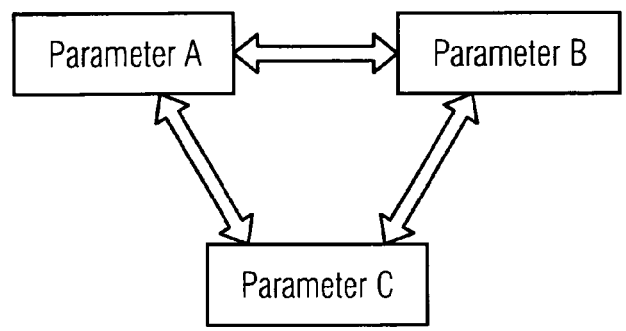
FIGS. 26A, 26B show diagrams for illustrating the separation of a parameter from a parameter group.
Figure 26B:
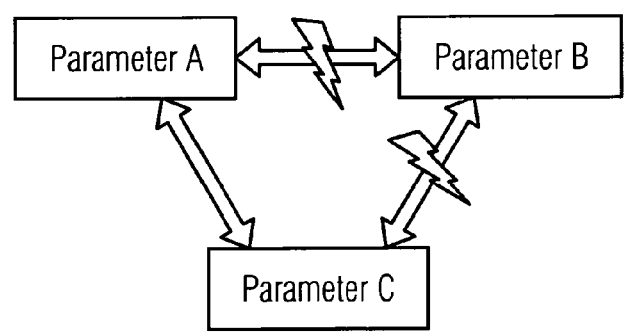

FIG. 26A shows an example of a bidirectional parameter group consisting of three device parameters A, B, C. If the communication is broken with device parameter B, this device parameter becomes orphaned from the parameter group as shown in FIG. 26B. If the device parameter still has all parameter group entries in its parameter group list it can operate independently of the other device parameters.

For example, if the parameter value of device parameter A changes in the meantime, this change would normally be sent to other device parameters of the parameter group, i.e. to the device parameters B, C. Since the data link between device parameter A and device parameter B is severed, any communication with the device parameter B fails. After a number of retries, the device parameter B will be determined by device parameter A to be offline requiring an update of the local parameter group list PGL of device parameter A. In case that device parameter A is the first device parameter in a parameter group to detect that device parameter B is offline or separated from the parameter group and the status of the device parameter is not yet set to offline within the parameter group list PGL, the detecting device parameter A sends a set group list command message to all remaining device parameters within the parameter group providing an updated parameter group list with the status of the separated device parameter B set to offline.

Figure 27:
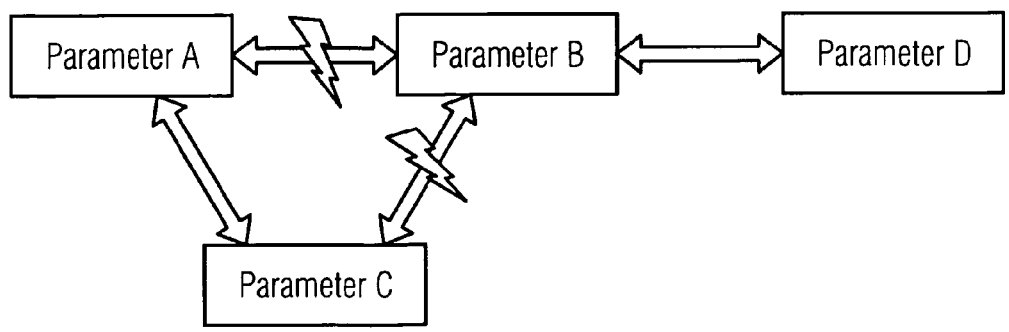
FIG. 27 shows a diagram for illustrating the operation of a parameter group in a disconnected state.

In the same way if the value of device parameter B changes this change would normally be sent to the other device parameters A and C of the parameter group shown in FIG. 26A. Since the communication has been severed with these other device parameters A and C a parameter update command message does fail. The other device parameters A and C are flagged as being offline in the parameter group list of device parameter B. After the separation of device parameter B as shown in FIG. 26B there exists temporarily two separated device parameter groups, i.e. a first device parameter group consisting of parameters A, C and a second device parameter group consisting only of device parameter B. When these parameter groups are disconnected or separated, it is possible for additional device parameters to join one of the two separated subgroups. For example, a further device parameter D can request to join device parameter B as illustrated in FIG. 27. The parameter group list that device parameter B returns to the requesting device parameter D contains the entries for device parameters A, C although the status of these device parameters is set to offline in the respective parameter group list PGL of device parameter B. In contrast, the device parameter group list PGL of device parameters A and C is not updated because communication is still severed between the two subgroups of device parameters, i.e. the first group comprising parameters A, C and the second group comprising parameters B, D. FIG. 27 illustrates two parameter groups operating in a disconnected state.

If the link between device parameters A, C to device parameters B, D is re-established the original parameter groups will re-establish themselves along with any new device parameters that have joined the parameter group. On the first parameter update from any of the four device parameters A, B, C, D an update of all device parameters within the parameter groups is performed including those device parameters that are currently offline. The parameter updates of the offline parameters succeeds, which triggers the resynchronization of the parameter group lists. The requesting device parameter requests parameter group lists from each of the offline device parameters and updates its local parameter group list accordingly.

Figure 28:
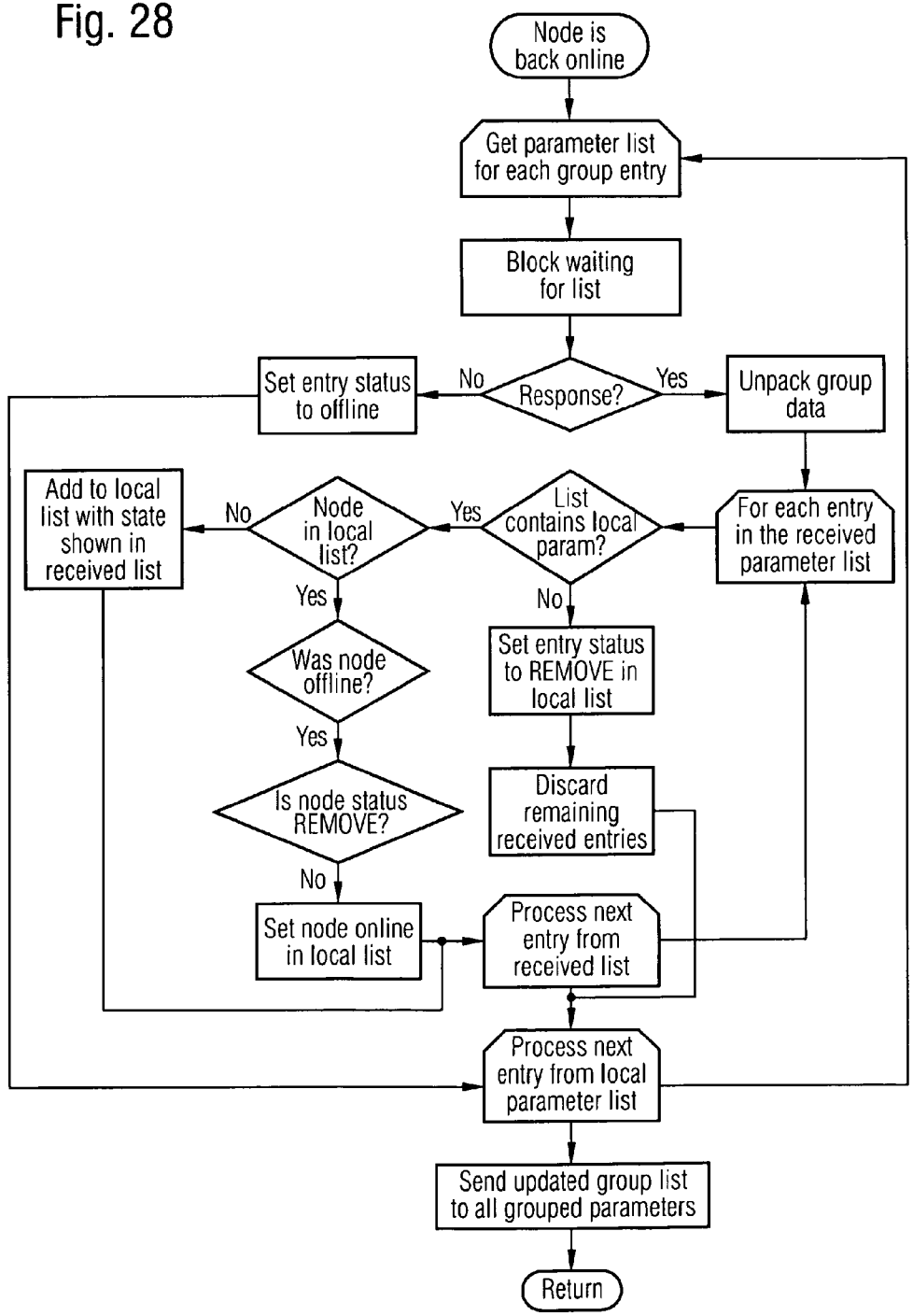
FIG. 28 shows a flowchart of a possible embodiment of a group update mechanism as employed by the method according to the present invention.

FIG. 28 shows a flowchart of a possible embodiment of a parameter group update mechanism, ensuring group validity.

To avoid the updating of device parameters in a feedback loop, a request to update a device parameter transmitted as a result of a join mechanism and a conventional device parameter update have different command qualifiers as illustrated in the table of FIG. 29.

Joined device parameter update messages are only sent as a result of a conventional parameter update message being received. This is followed by sending a value change of the device parameter to the other joined device parameters. These conventional parameter update messages can follow the full data block with a hierarchical parameter address or identifier message formats. The joined parameter update follows the identifier message format because the parameter group data is stored in identifier form.

The method according to the present invention provides a mechanism for joining device parameters into parameter groups. Further, the method according to the present invention provides the possibility to regroup device parameters after fragmentation. Device parameters of the parameter groups can be any parameters of a multimedia apparatus 5 which in turn forms part of the digital multimedia network 1 according to the present invention. Parameter groups can be either absolute or relative. An event notification or a message can be bidirectional (peer-to-peer) or unidirectional (master-to-slave).

The method according to the present invention can be applied, wherever there is a need to control multiple device parameters by a single controller. For example, if multiple gains are to be controlled by a single slider the capability of joining device parameters into device parameter groups is necessary. This need exists in many contexts, i.e. live sound, hotels and convention centers, studios, broadcast houses, legal and parliamentary buildings and many others.

Apart from linking multiple signal processing parameters to one or more controllers, the join mechanism according to the present invention offers the possibility of creating and breaking multiple actions with a single command message and thereby facilitating the creation of back-up configurations.

FIGS. 30A, 30B show embodiments of a control device 3 according to the present invention. In the embodiment shown in FIG. 30A, the control device 3 according to the present invention is integrated into a multimedia apparatus 5, such as a mixing console, an amplifier or a loudspeaker of a digital multimedia network 1.

In the embodiment shown in FIG. 30B, the control device 3 according to the present invention is connectable to a multimedia apparatus 5 via an interface 6A, 6B such as an USB-interface, a MIDI-interface, a TDM-interface, or an $I^2S$-interface. In another embodiment, the control device 3 is connectable to the multimedia apparatus 5 via a wireless interface.

The control devices 3 shown in FIGS. 30A, 30B comprise processing means, such as a microprocessor for processing an XFN stack according to an XFN control protocol. In a possible embodiment, the XFN stack is stored as firmware in a data memory of the control device 3. In a possible embodiment, the XFN firmware is downloaded via the digital multimedia network 1 from a server. In an alternative embodiment, the XFN stack firmware is loaded into the control device 3 from a data carrier.

In the embodiment as shown in FIG. 30B, the XFN stack device 3 can be formed by an USB-stick which is plugged into a multimedia apparatus 5, such as a mixing console or an amplifier by means of an USB-interface. The embodiment as shown in FIG. 30B has the advantage that the hardware of an existing multimedia apparatus 5 does not have to be changed to allow a communication according to the XFN control protocol.

The invention claimed is:

1. A digital multimedia network with a parameter join mechanism to join device parameters in a parameter group,
said network comprising at least one apparatus having a memory for storing at least one parameter group list, wherein:
each device parameter of the apparatus holds a parameter group list of other device parameters on the same or different apparatuses to which it is joined;
a requesting device parameter of a source apparatus updates its local parameter group list by adding an entry for each device parameter of a target apparatus which joins said parameter group;
a request to update a device parameter transmitted by said requesting device parameter as a result of a parameter join mechanism comprises a different command qualifier than a conventional device parameter update;
said parameter group is a bidirectional parameter group
a change in any device parameter of said parameter group triggers a corresponding change of all other device parameters of said bidirectional parameter group; and
a requesting device parameter of a source apparatus sends a command for generating a bidirectional group relationship with other device parameters of said digital multimedia network, a get parameter group list command message to at least one device parameter of a target apparatus, to receive a response message containing a parameter group list stored in said target apparatus, which is added to the local parameter group list to form an updated local parameter group list of said source apparatus, which also comprises said requesting device parameter.

2. The digital multimedia network according to claim 1, wherein said local parameter group list is stored in a memory of said source apparatus 3. The digital multimedia network according to claim 2, wherein said parameter group list comprises for each device parameter of said parameter group
an IP-address of the target apparatus,
a hierarchical parameter address of said device parameter and/or
a parameter identifier value of said device parameter.

4. The digital multimedia network according to claim 3, wherein a requesting device parameter of a source apparatus removes a device parameter of a target apparatus from a parameter group by cancelling the entry of the respective device parameter in the parameter group list of the parameter group.

5. The digital multimedia network according to claim 4, wherein said parameter group list comprises for each device parameter at least one status flag indicating a status of said device parameter.

6. The digital multimedia network according to claim 5, wherein said status flag indicates whether said device parameter is permanently or temporarily severed from said parameter group.

7. The digital multimedia network according to claim 1, wherein a device parameter of said parameter group is controlled by sending a command message to a control device of said target apparatus.

8. The digital multimedia network according to claim 1, wherein the updated local parameter group list is stored by said source apparatus and sent in a set parameter group list command message to all target apparatuses comprising at least one device parameter of said updated parameter group list.

9. The digital multimedia network according to claim 1, wherein if a device parameter of a source apparatus detects that another device parameter of a target apparatus is severed from the parameter group of said detecting device parameter and that a status flag of the severed device parameter in the parameter group list does not yet indicate that the other device parameter is severed then the source apparatus sends a set parameter group list command message to all target apparatuses comprising the remaining device parameters within said parameter group to provide an updated parameter group list, wherein the status flag of the severed device parameter indicates that the severed device parameter is offline.

10. The digital multimedia network according to claim 1, wherein if a device parameter of a source apparatus detects that another device parameter of a target apparatus is no longer severed from the parameter group of said detecting device parameter and that a status flag of said other device parameter still indicates that the other device parameter is offline then the source apparatus sends a set parameter group list command message to all target apparatuses comprising the remaining device parameters within said parameter group to provide an updated parameter group list, wherein the status flag of said other device parameter is set such that it indicates that the other device parameter is not severed from the parameter group.

11. A digital multimedia network with a parameter join mechanism to join device parameters in a parameter group, said network comprising at least one apparatus having a memory for storing at least one parameter group list, wherein:
each device parameter of the apparatus holds a parameter group list of other device parameters on the same or different apparatuses to which it is joined;
a requesting device parameter of a source apparatus updates its local parameter group list by adding an entry for each device parameter of a target apparatus which joins said parameter group;
a request to update a device parameter transmitted by said requesting device parameter as a result of a parameter join mechanism comprises a different command qualifier than a conventional device parameter update;
if a device parameter of a source apparatus detects that another device parameter of a target apparatus is severed from the parameter group of said detecting device parameter and that a status flag of the severed device parameter in the parameter group list does not yet indicate that the other device parameter is severed then the source apparatus sends a set parameter group list command message to all target apparatuses comprising the remaining device parameters within said parameter group to provide an updated parameter group list; and
the status flag of the severed device parameter indicates that the severed device parameter is offline.

12. A digital multimedia network with a parameter join mechanism to join device parameters in a parameter group, said network comprising at least one apparatus having a memory for storing at least one parameter group list, wherein:
each device parameter of the apparatus holds a parameter group list of other device parameters on the same or different apparatuses to which it is joined;
a requesting device parameter of a source apparatus updates its local parameter group list by adding an entry for each device parameter of a target apparatus which joins said parameter group;
a request to update a device parameter transmitted by said requesting device parameter as a result of a parameter join mechanism comprises a different command qualifier than a conventional device parameter update;
if a device parameter of a source apparatus detects that another device parameter of a target apparatus is no longer severed from the parameter group of said detecting device parameter and that a status flag of said other device parameter still indicates that the other device parameter is offline then the source apparatus sends a set parameter group list command message to all target apparatuses comprising the remaining device parameters within said parameter group to provide an updated parameter group list; and
the status flag of said other device parameter is set such that it indicates that the other device parameter is not severed from the parameter group.

* * * * *